US012727035B2

(12) United States Patent
Orsino et al.

(10) Patent No.: US 12,727,035 B2
(45) Date of Patent: Sep. 1, 2026

(54) PRIORITIZATION BETWEEN MULTIPLE RANDOM ACCESS CHANNEL PROCEDURES

(71) Applicant: TELEFONAKTIEBOLAGET LM ERICSSON (PUBL), Stockholm (SE)

(72) Inventors: Antonino Orsino, Jorvas (FI); Pontus Wallentin, Linköping (SE); Icaro Leonardo Da Silva, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/249,927

(22) Filed: Jun. 25, 2025

(65) Prior Publication Data

US 2026/0089771 A1 Mar. 26, 2026

Related U.S. Application Data

(63) Continuation of application No. PCT/SE2024/050818, filed on Sep. 25, 2024.

(60) Provisional application No. 63/585,180, filed on Sep. 25, 2023.

(51) Int. Cl.
*H04W 74/0836* (2024.01)
*H04W 72/23* (2023.01)

(52) U.S. Cl.
CPC ....... *H04W 74/0836* (2024.01); *H04W 72/23* (2023.01)

(58) Field of Classification Search
CPC ............. H04W 72/23; H04W 74/0833; H04W 74/0836; H04W 36/0055; H04B 7/06964
See application file for complete search history.

(56) References Cited

U.S. PATENT DOCUMENTS

2024/0064842 A1* 2/2024 Ye .................... H04W 52/0212
2024/0340856 A1* 10/2024 Bai ...................... H04W 72/02

OTHER PUBLICATIONS

Ericsson, "RRC running CR for LTM", 3GPP TSG-RAN WG2 Meeting #123, R2-2308435, Aug. 21-25, 2023, 95 Pages, Toulouse, France.
Mediatek Inc. et al., "38.300 running CR for introduction of NR further mobility enhancements", 3GPP TSG-RAN WG2 Meeting #123, R2-2309335, Aug. 21-25, 2023, 30 Pages, Toulouse, France.
Mediatek Inc., et al., "Revised WID on Further NR mobility enhancements", 3GPP TSG RAN Meeting #100, RP-231475, Jun. 12-14, 2023, 5 Pages, Taipei.
Nokia, et al., "Title", 3GPP TSG RAN WG1 #113, R1-2305157, May 22-26, 2023, 8 Pages, Incheon, Korea.

(Continued)

*Primary Examiner* — Quoc Thai N Vu
(74) *Attorney, Agent, or Firm* — Ericsson Inc.

(57) ABSTRACT

Embodiments of the present application set forth techniques for operating a user equipment, UE. A method includes determining that a first trigger to initiate a first random access, RA, procedure has been met. The method further includes, subsequent to determining that the first trigger has been met and prior to the first RA occasion, determining that a second trigger to initiate a second RA procedure has been met. The method further includes, responsive to determining that the second trigger has been met, prioritizing one of the first RA procedure or the second RA procedure based on one or more prioritization rules.

12 Claims, 9 Drawing Sheets

(56) References Cited

OTHER PUBLICATIONS

OPPO, "Discussion on early sync and RACH-less for LTM", 3GPP TSG-RAN WG2 Meeting #123, R2-2308037, Aug. 21-25, 2023, 3 Pages. Toulouse, France.
ZTE Corporation, et al., "Considerations on RACH procedure for early TA acquisition", 3GPP TSG RAN#123 Meeting, R2-2308840, Aug. 21-25, 2023, 6 Pages, Toulouse, France.
ZTE et al., "TP for LTM BL CR to TS 38.401", 3GPP TSG-RAN WG3 #120, R3-233495, May 22-26, 2023, 6 Pages, Incheon.

* cited by examiner

UE gNB(Cell A)

gNB(Cell B)

UE in RRC_CONNECTED
CM-CONNECTEC

1.RRCReconfiguration
(including TA acquisition configuration of Cell B)

2. RRCReconfigurationComplete

3. PDCCH order
(indicating UE to perform TA acquisition procedure to Cell B)

4. Random Access Preamble transmission

5. TA value
(e.g. in cell switch command indicating Cell B as target cell )

PRIORITIZATION BETWEEN MULTIPLE RANDOM ACCESS CHANNEL PROCEDURES

RELATED APPLICATIONS

The present application is a continuation of International Application No. PCT/SE2024/050818, filed Sep. 25, 2024, which claims priority to U.S. Provisional Patent Application No. 63/585,180, filed Sep. 25, 2023, entitled "PRIORITIZATION BETWEEN MULTIPLE RANDOM ACCESS CHANNEL PROCEDURES," the disclosures of which are hereby incorporated herein by reference in their entirety.

TECHNICAL FIELD

The present disclosure is related to wireless communication systems and more particularly to prioritization between multiple random access channel ("RACH") procedures.

BACKGROUND

A UE may be instructed by the network to initiate an early uplink ("UL") sync procedure where a random access preamble is sent to a lower-layer triggered mobility ("LTM") candidate cell indicated within a physical downlink control channel ("PDCCH") order received. Currently, there is no agreed procedure for how to handle a scenario in which the UE needs to perform a random access ("RA") procedure towards the serving cell and a RA procedure towards a candidate cell (e.g., triggered because of the early UL sync procedure). In some examples, which of the RA procedures to prioritize is up to the UE implementation.

In some examples, all the radio resource control ("RRC") configurations related to early RACH are specific per LTM candidate cell and signalled separately from the candidate cell configuration (i.e. LTM Candidate configuration). In additional or alternative examples, the early RACH procedure shares a media access control ("MAC") entity with a legacy RACH procedure. (e.g., no extra MAC entity is needed for early RACH). In additional or alternative examples, it is up to UE implementation to handle the RACH initiation collisions where the early RACH is getting involved. No specification change can be foreseen.

SUMMARY

Certain aspects of the disclosure and their embodiments may provide solutions to these or other challenges. In order to address the above challenges, various embodiments herein present a procedure to be implemented by a UE, that is configured with one or more serving cells and one or more LTM candidate cell(s), and that is triggered to perform multiple RA procedures for a serving cell and/or one or more LTM candidate cell(s) (e.g., for the early UL sync procedure).

There is provided a method for operating a UE. The method includes determining that a first trigger to initiate a first random access, RA, procedure has been met. The method further includes, subsequent to determining that the first trigger has been met and prior to the first RA occasion, determining that a second trigger to initiate a second RA procedure has been met. Finally, the method includes, responsive to determining that the second trigger has been met, prioritizing the first RA procedure or the second RA procedure. The prioritizing is based on one or more prioritization rules, the prioritization rules including at least one of: prioritize the RA procedure associated with a serving cell;

- prioritize the RA procedure that is triggered due to a failure event;
- prioritize the RA procedure that is triggered due to an early UL sync procedure;
- prioritize the RA procedure based on an order for which the indication to initiate the RA procedures is received;
- prioritize the RA procedure based on L1 measurements;
- prioritize the RA procedure based on L3 measurements;
- prioritize the RA procedure based on a strongest cell out of "N" cells, according to a measurement quantity;
- prioritize the RA procedure associated with a cell based on when the communication last performed a random access procedure with the cell;
- prioritize the RA procedure for which the UE has initiated a random access procedure and is about to perform a random access preamble retransmission;
- prioritize the RA procedure for which it performs a first random access preamble transmission;
- prioritize the RA procedure for which the random access would be transmitted with highest power;
- prioritize the RA procedure for which the random access would be transmitted with lowest power;
- prioritize the RA procedure based on link budget;
- prioritize the RA procedure based on feature prioritization for the random access;
- prioritize the RA procedure for which the random access is a 2-step random access;
- prioritize the RA procedure for which the random access is a 4-step random access;
- prioritize the RA procedure for which the random access is a contention-free random access;
- prioritize the RA procedure for which the random access is a contention-based random access;
- prioritize the RA procedure based on random access resource selection;
- prioritize the RA procedure for which beam failure recovery timer is running or not running;
- prioritize the RA procedure based on random selection;
- prioritize the RA procedure based on round-robin selection;
- prioritize the RA procedure based on access barring or access control;
- prioritize the RA procedure associated with a LTM candidate cell in detriment of a RA to a serving cell when the UE has received the trigger for RACH transmission to the LTM candidate cell in response to a PDCCH order received in response to a lower layer measurement; and
- prioritize performing RA to a first LTM candidate cell in detriment of performing RA to a second LTM candidate cell when RA to the first LTM candidate cell is triggered for an LTM cell switch compared to the triggering of RA to the second LTM candidate cell being for other events.

In some embodiments the determining that the second trigger has been met includes determining that the second trigger has been met prior to the first RA occasion.

In some embodiments the first RA occasion is the first RA occasion available during which the first RA preamble could be scheduled to be transmitted as part of the first RA procedure.

In some embodiments, a UE, in response to a first trigger to initiate a RA procedure to the serving cell and to at least a second trigger to initiate a RA procedure to one or more LTM candidate cell(s), the UE prioritizes one of the triggered RA procedure(s). The UE prioritizes a cell (e.g., a serving cell or one of the LTM candidate cells) for continuing a RA procedure, according to one or more rules. In additional or alternative embodiments, once the UE determines towards which cell the RA procedure is to be continued, the UE transmits a RA preamble towards the selected cell.

In additional or alternative embodiments, the UE triggers a RA procedure to a serving cell (e.g., declaration of a of BFD followed by a BFR, or reception of a PDCCH order from the network for a serving cell) while there is an ongoing RA procedure with the LTM candidate cell, for example, the UE has received a PDCCH order to send a preamble to an LTM candidate cell, but it has not yet transmitted the preamble and/or it has not performed the necessary measurements (e.g., based on SSBs and/or CSI-RSs of the LTM candidate cell) for RA resource selection.

In additional or alternative embodiments, the UE triggers a RA procedure to an LTM candidate cell (e.g. reception of a PDCCH order for establishment of early UL synchronization/Time Advance, TA, establishment, or reception of an LTM cell switch command which requires RA) while there is an ongoing RA procedure with a serving cell e.g. the UE has declared a BFD followed by Beam Failure Recovery, BFR, but it has not yet transmitted the preamble and/or it has not performed the necessary measurements (e.g. based on Synchronization Signal/PBCH block, SSBs, and/or Channel State Information Reference Signals, CSI-RSs, of the LTM candidate cell) for RA resource selection and/or it has not received yet a Random Access Response ("RAR").

In some examples, of a RA procedure triggered to the LTM candidate cell, in the case of the early UL sync, the UE does not expect a Random Access Response ("RAR").

In additional or alternative examples, the terms first trigger and second trigger do not necessarily imply that the first trigger always occurs before the second trigger, even if that could be an example. The terms first and second are in principle a way to distinguish these as different RA procedures and different triggers, for a serving cell and/or for an LTM candidate cell.

There is provided a UE. The communication the UE includes a processing circuitry and a memory coupled to the processing circuitry. The memory having instructions stored therein that are executable by the processing circuitry to cause the UE to perform operations comprising any of the operations of the methods disclosed herein.

There is provided a computer program comprising program code to be executed by processing circuitry of a UE, whereby execution of the program code causes the UE to perform operations comprising any operations of the methods disclosed herein.

There is provided a computer program product comprising a non-transitory storage medium including program code to be executed by processing circuitry of a UE, whereby execution of the program code causes the UE to perform operations comprising any operations of the methods disclosed herein.

There is provided a non-transitory computer-readable medium having instructions stored therein that are executable by processing circuitry of a UE to cause the UE to perform operations comprising any of the operations of the methods disclosed herein.

Certain aspects of these embodiments may provide technical advantages. In some embodiments, cell prioritization can avoid an interruption (or even causing a failure) towards the serving cell. In additional or alternative embodiments, transmissions and receptions towards the serving cell will not stay out of sync for very long. In additional or alternative embodiments, the cell prioritization can allow the UE to avoid or reduce delaying a random access procedure for, for example, the early UL sync procedure with the consequence that the network may not have enough time to calculate a TA value before an LTM cell switch procedure is triggered at the UE. In this case, since the LTM cell switch command that is sent to the UE to initiate an LTM cell switch procedure may include a TA value, if the network is not able to calculate a TA the only solution for the UE is to perform an LTM cell switch procedure which includes initiating a random access procedure.

As there may be different situations in which a RA is triggered for a serving cell and for an LTM candidate cell, the UE prioritizes a RA procedure depending on the situation and how serious it is to postpone, abort, or suspend one of the RA procedures.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figures 1, 2:
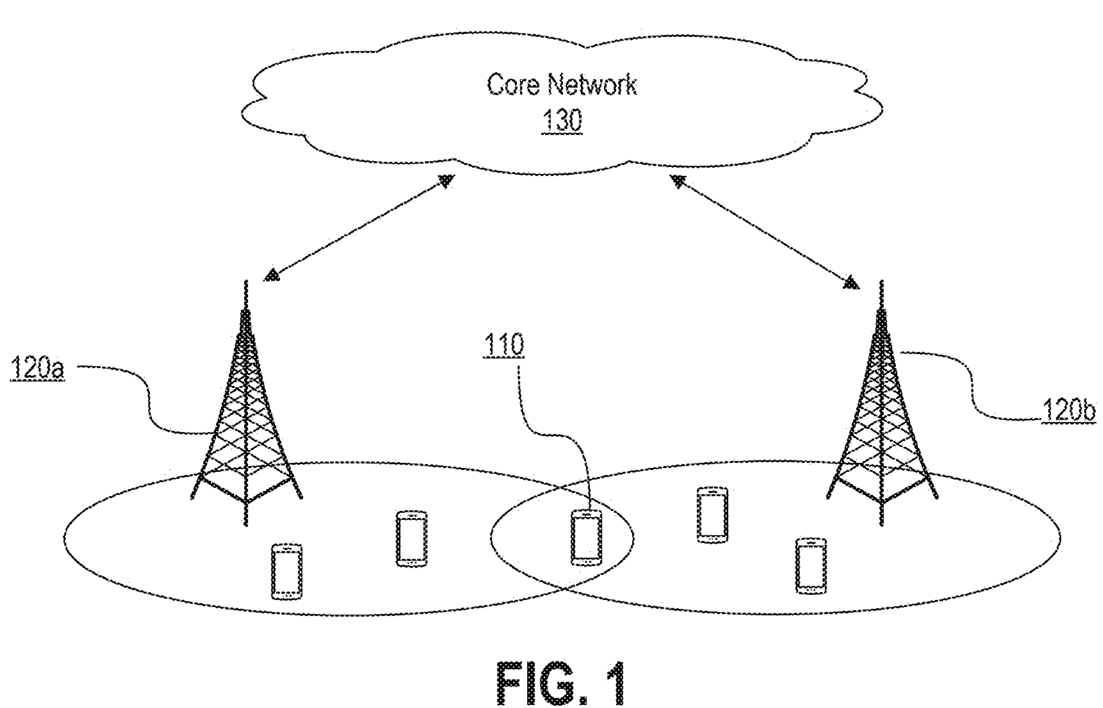
FIG. 1 is a schematic diagram illustrating an example of a 5th generation ("5G") network.
FIG. 2 is a signal flow diagram illustrating an example of a signaling flow for early UL synchronization.

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

In the third generation partnership project ("3GPP") Release 18, a work item known as Further NR mobility enhancements has been agreed. This work item includes a technical area entitled L1/L2 based inter-cell mobility. According to the Work Item Description ("WID") when the UE moves from the coverage area of one cell to another cell, at some point a serving cell change needs to be performed. Currently serving cell change is triggered by L3 measurements and is done by RRC signaling triggered Reconfiguration with Synchronization for change of PCell and PSCell, as well as release add for SCells when applicable. All cases involve complete L2 (and L1) resets, leading to longer latency, larger overhead and longer interruption time than beam switch mobility. The goal of L1/L2 based inter-cell mobility is to enable a serving cell change via L1/L2 signaling, in order to reduce the latency, overhead and interruption time.

A basic principle with L1/L2-triggered mobility, also called L1/L2 Triggered Mobility ("LTM") is that the UE is pre-configured, by the network, with an RRC configuration per LTM candidate cell, sometimes also known as a LTM candidate cell configuration. Such a LTM candidate cell configuration may be an RRCReconfiguration message or one or more IEs/fields/parameters such as CellGroupConfig which is stored when the UE is configured with LTM. The UE transmits lower layer measurements (e.g., L1-RSRP) on these candidate LTM candidate cells to the network. In response, the UE receives from the network a lower layer signal (such as a MAC CE or DCI) to trigger the execution of LTM cell switch in the UE, sometimes also referred to as a LTM cell switch command: in response the UE accesses the LTM candidate cell indicated in the LTM cell switch command and switches to a configuration of an LTM candidate cell. When the UE is configured with multiple LTM candidate cells, the UE receives multiple LTM candidate cell configuration(s) e.g. multiple RRCReconfiguration messages to be stored, each associated to an LTM candidate ID which may be later referred in the LTM cell switch command the UE may receive, to indicate to which of the LTM candidate cells the UE needs to perform the LTM cell switch.

In Rel-18, a UE that is configured with LTM with one or more LTM candidate cells may be triggered to perform what is called "early UL sync" (or Time alignment establishment). In this case, the network instruct the UE (by providing a PDCCH order after a Random Access configuration) to send a preamble to an LTM candidate cell so that the network node (e.g. gNodeB) associated with the LTM candidate cell, when receiving the preamble, can calculate a Timing Advance (TA) value and send it to the network node associated to the serving cell of the UE (e.g. a Serving DU, S-DU). The network node associated to the serving cell, then, may include the TA value within the LTM cell switch command (e.g. a MAC CE for LTM cell switch) when triggering the execution of the LTM cell switch procedure.

FIG. 1 illustrates an example of a new radio ("NR") network (e.g., a 5th Generation ("5G") network) including a 5G core ("5GC") network 130, network nodes 120*a-b* (e.g., 5G base station ("gNB")), multiple communication devices 110 (also referred to as user equipment ("UE")).

FIG. 2 illustrates an example of an early TA acquisition (early UL sync) procedure triggered by the network. At block 1, the gNB to which Cell A belongs provides the TA acquisition configuration to the UE within the RRCReconfiguration message. The TA acquisition configuration includes RRC configuration information required to send a random access preamble to Cell B so that the gNB to which Cell B belongs can calculate a TA value to be used by the UE, for example, in case an LTM cell switch procedure is executed to Cell B. The TA acquisition configuration may include information for one or multiple cells to which the TA acquisition procedure may be executed by the UE.

At block 2, the UE replies with the RRCReconfigurationComplete message.

At block 3, the gNB to which Cell A belongs sends a PDCCH order message to the UE in order to initiate a TA acquisition procedure with Cell B. [The PDCCH order includes the information required to sends a random access preamble to Cell B.]

At block 4, the UE sends a random access preamble to Cell B so that the gNB to which Cell B belongs can calculate a TA value to be used by the UE, e.g., if an LTM cell switch procedure is triggered to Cell B. In some examples, the gNB to which Cell A belongs may indicate the retransmission of preamble for TA acquisition in case no TA is obtained, possibly with power ramping.

At block 5, the gNB to which Cell A belongs provides the TA value calculated by the gNB to which Cell B belongs during the TA acquisition procedure, e.g. in LTM cell switch command MAC CE which initiate cell switch procedure to Cell B in case an LTM cell switch procedure is triggered to Cell B.

In some examples, when the UE is configured by the network, it is possible for a UE in RRC_CONNECTED to be UL synchronized with an LMT candidate cell which is different from the current serving cell, so that in this case, there may be no need to trigger the "early UL sync" procedure.

Currently, a UE may be instructed to perform a procedure requiring a Random Access ("RA") procedure (e.g., including the transmission of a RA preamble) to a serving cell and/or to one or more LTM candidate cell within a short time interval. For example, the UE may be triggered to perform a second RA procedure while a first RA procedure is still ongoing and/or has not been completed yet. That may occur in different scenarios, as follows. In a first scenario, the UE is triggered to perform RA to the serving cell (e.g., triggered by a Beam Failure Detection ("BFD") in a primary cell ("PCell")) between the time instance in which the UE has been triggered to perform RA to an LTM candidate cell (e.g., triggered by a PDCCH order), but before the UE has transmitted the RA preamble to the LTM candidate cell, due to the fact that the new trigger for RA in the serving cell occurs before the actual RA resource in the time domain for the LTM candidate cell and/or before the UE had time to perform measurements for RA resource selection one synchronization signal blocks ("SSBs") of the LTM candidate cell. It is up to UE implementation to handle the RACH initiation collisions where the early RACH is getting involved. Thus, it is not obvious which criteria a UE implementation should use to handle the RA initiation (or RA Channel-RACH procedure initiation, as written in the RAN2 agreement) collisions when RA is triggered for early RACH to one or more LTM candidate and/or to a serving cell, especially considering that there may be a diversity of scenarios in which RA is triggered e.g. Beam Failure Recovery in response to a Beam Failure Detection in a Serving cell, or an UL transmission to a serving cell when Time Alignment timer has expired.

RA resource or RA occasion is an area specified in time and frequency domain that are available for the reception of RACH preamble. Throughout the embodiments, RA resource or RA occasion may be interchangeably used.

Figure 3:
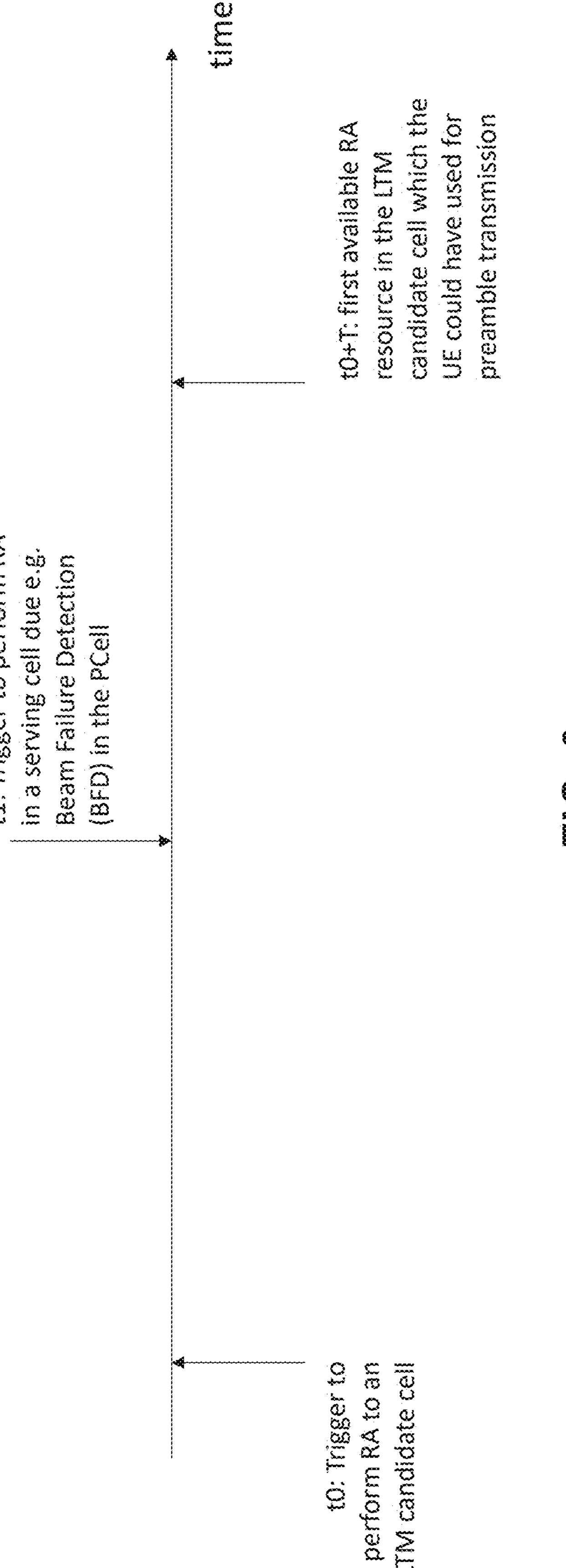
FIG. 3 is a diagram illustrating example of timelines in which a UE triggers a second RA procedure before a first RA procedure is completed.

FIG. 3 illustrates an example of this first scenario in which a UE triggers a second RA procedure (e.g., BFD at the serving cell) before a first RA (e.g., to LTM candidate cell) is completed.

In another scenario, the UE is triggered to perform RA to an LTM candidate cell at t1 by the network, upon reception of a Physical Downlink Control Channel ("PDCCH") order. However, before the UE has received that PDCCH order, BFD had been declared by the UE for a serving cell (e.g., PCell) at t0, but the UE had not yet sent the preamble (since the first RA occasion in the serving cell for Beam Failure Recovery occurs at t0+T, which is before t1). In that case, the network was not really aware of an ongoing RA procedure which had been initiated when it sends to the UE the trigger to perform RA to an LTM candidate cell e.g. for early UL sync.

Figure 4:
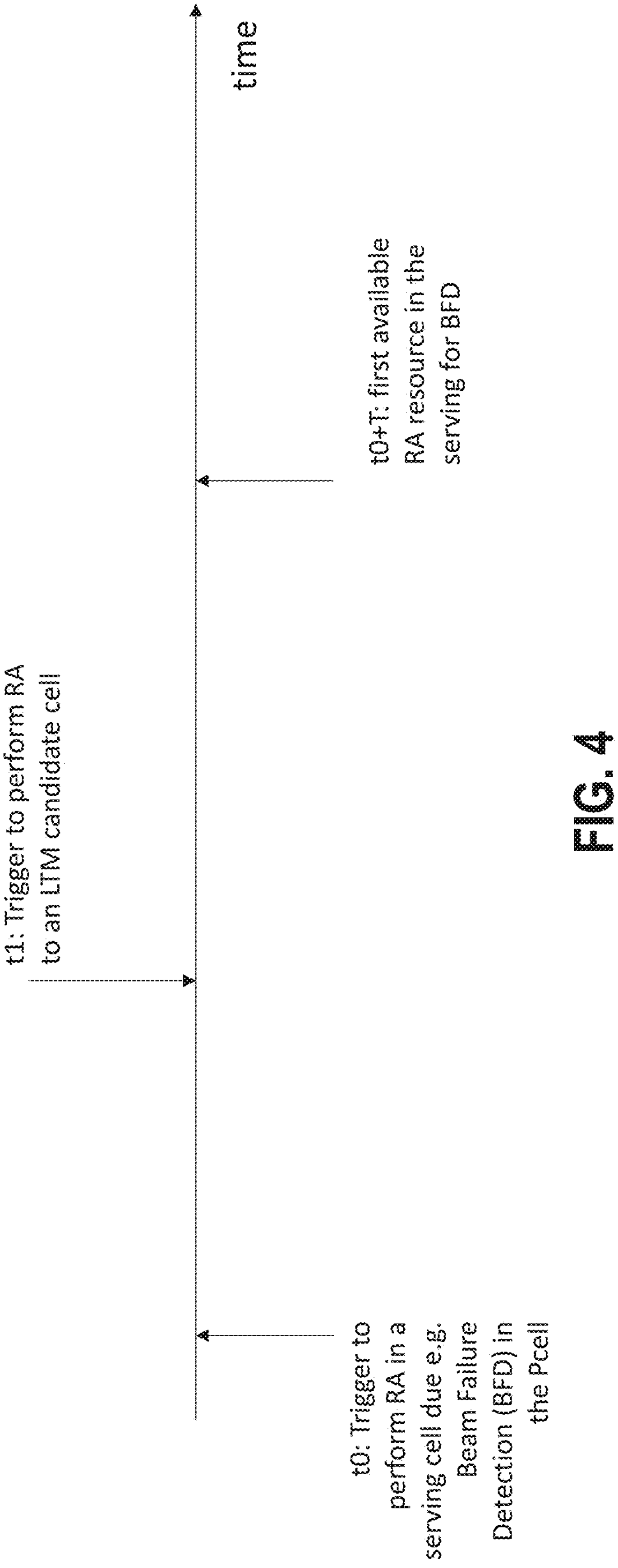
FIG. 4 is a diagram illustrating example of timelines in which a UE triggers a second RA procedure before a first RA procedure is completed.

FIG. 4 illustrates an example of this scenario in which the UE receives a command to trigger a second RA procedure (e.g., to LTM candidate cell) at t1, but at to the UE had initiated a RA procedure not yet completed (e.g., BFD at the serving cell) since the first RA resource available for that first RA procedure in the serving cell occurs after t1.

In yet another scenario, the UE is triggered to perform RA to the serving cell (e.g., triggered by a BFD in the PCell) by the network (e.g., PDCCH order from the network) between the time in which it has been triggered to perform RA to an LTM candidate cell (e.g. triggered by a PDCCH order), but before it has transmitted the RA preamble to the LTM candidate cell, due to the fact that the new trigger for RA in the serving cell occurs before the actual RA resource in the time domain for the LTM candidate cell and/or before the UE had time to perform measurements for RA resource selection one SSBs of the LTM candidate cell. The difference here from the first scenario is that the UE receives a PDCCH from the network while it has not completed the other RA procedure, also triggered by the network.

Figure 5:
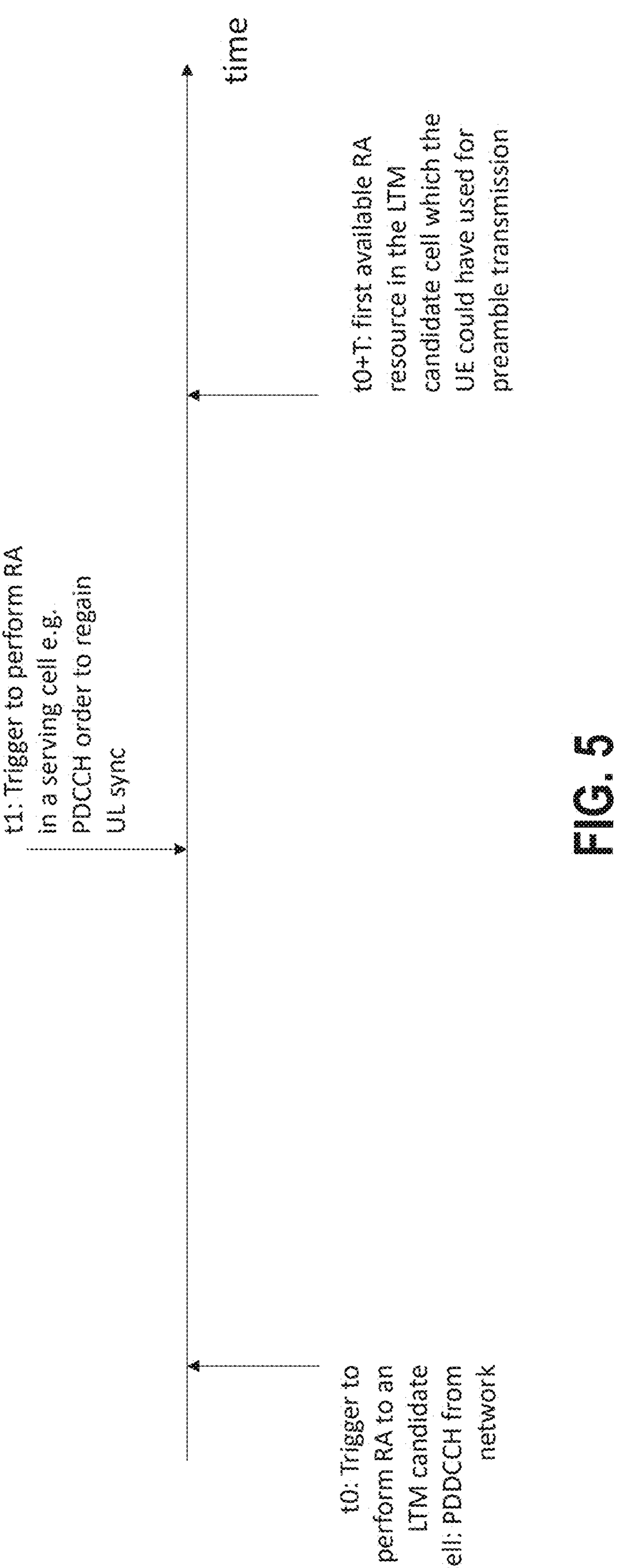
FIG. 5 is a diagram illustrating example of timelines in which a UE triggers a second RA procedure before a first RA procedure is completed.

FIG. 5 illustrates an example of this scenario in which the UE receives a PDCCH triggering a RA to an LTM candidate cell at t0, but before the first RA resources in the LTM candidate cell and/or before the UE has time to perform SSB measurement in the LTM candidate cell for RA resource selection, the UE receives at t1 another PDCCH order triggering RA in a serving cell e.g. to regain UL sync.

Various embodiments are described herein for prioritizing between multiple RA procedures. A UE (also referred to herein as a communication device) can be configured with at least one serving cell and at least one LTM candidate cell. In response to a first trigger to initiate a first RA procedure and a least a second trigger to initiate a second RA procedure, the UE can prioritize one of the triggered RA procedure(s) for continuing a RA procedure, according to one or more rules. In some examples, the first RA procedure is on a serving cell and the second RA procedure is on an LTM candidate cell. In additional or alternative examples, the first RA procedure is on an LTM candidate cell and the second RA procedure is on a serving cell. In additional or alternative examples, the first RA procedure is on a first LTM candidate cell and the second RA procedure is on a second LTM candidate cell.

In additional or alternative embodiments, prioritizing one of the triggered RA procedure(s) includes aborting or stopping the first RA procedure and performing the second RA procedure. In some examples, the second RA procedure is triggered while the first RA procedure is ongoing (e.g., it had been initiated and/or it had not been completed).

In additional or alternative embodiments, prioritizing one of the triggered RA procedure(s) includes pausing, suspending, delaying or postponing the first RA procedure and performing the second RA procedure. In some examples, the second RA procedure is triggered while the first RA procedure is ongoing (e.g., it had been initiated and/or it had not been completed).

In additional or alternative embodiments, prioritizing one of the triggered RA procedure(s) includes aborting or stopping the second RA procedure and performing the first RA procedure. In some examples, the second RA procedure is triggered while the first RA procedure is ongoing (e.g., it had been initiated and/or it had not been completed).

In additional or alternative embodiments, prioritizing one of the triggered RA procedure(s) includes pausing, suspending, delaying or postponing the second RA procedure and continuing performing the first RA procedure. In some examples, the second RA procedure is triggered while the first RA procedure is ongoing (e.g., it had been initiated and/or it had not been completed).

In additional or alternative embodiments, in response to suspending, delaying, or postponing the first RA procedure and performing the second RA procedure, the UE resumes or initiates the first RA procedure when the second RA procedure is completed or successfully completed.

In additional or alternative embodiments, in response to suspending, delaying, or postponing the second RA procedure and performing the first RA procedure, the UE resumes or initiates the second RA procedure when the first RA procedure is completed or successfully completed.

In additional or alternative embodiments, in response to aborting the first RA procedure and performing the second RA procedure, the UE re-initiates the first RA procedure when the second RA procedure is completed or successfully completed.

In additional or alternative embodiments, in response to aborting the second RA procedure and performing the first RA procedure, the UE re-initiates the first RA procedure when the second RA procedure is completed or successfully completed.

In additional or alternative embodiments, prioritizing a triggered RA procedure includes: prioritizing the RA procedure on a serving cell, in detriment to a RA procedure on at least one LTM candidate cell; prioritizing the RA procedure on a first LTM candidate cell in detriment of the RA procedure on one or more of the other LTM candidate cell (not the first LTM candidate cell); and prioritizing an LTM candidate cell in detriment of a serving cell or a serving cell type (e.g., SCells, SCell of the MCG, SCells of the SCG).

In additional or alternative embodiments, the second trigger to initiate a second RA procedure occurs after the first trigger to initiate a first RA procedure and before the first RA procedure is completed and/or before the first RA procedure is successfully completed and/or before the UE has transmitted a preamble associated to the first RA procedure.

In additional or alternative embodiments, the UE prioritizes the first RA procedure or the second RA procedure according to one or more rules described below.

In some examples, the UE prioritizes a serving cell in case a random access procedure is triggered towards the serving cell (regardless on whether a random access procedure is triggered towards one or more LTM candidate cell(s)).

In additional or alternative examples, the UE prioritizes a cell for which the random access procedure is triggered due to a failure event (e.g., radio link failure, beam failure detection).

In additional or alternative examples, the UE prioritizes a cell for which the random access procedure is triggered due to an early UL sync procedure.

In additional or alternative examples, if the network indicates to the UE to initiate more than one random access procedure toward more than one cell, the UE prioritize a cell based on the order for which the indication to initiate the random access procedure has been received.

In additional or alternative examples, the UE prioritizes a cell based on L1 measurements (e.g., SS-RSRP).

In additional or alternative examples, the UE prioritizes a cell based on L3 measurements (e.g., cell-based RSRP).

In additional or alternative examples, the UE prioritize the strongest cell out of "N" cells, according to a measurement quantity, wherein a measurement quantity may correspond to RSRP, RSRQ, or SINR.

In additional or alternative examples, the UE prioritizes the cell for which it has most recently performed a random access.

In additional or alternative examples, the UE prioritizes the cell for which it has least recently performed a random access.

In additional or alternative examples, the UE prioritizes the cell for which it has initiated a random access procedure and is about to perform a random access preamble retransmission.

In additional or alternative examples, the UE prioritizes the cell for which it performs a first random access preamble transmission.

In additional or alternative examples, the UE prioritizes the cell for which the random access would be transmitted with highest power.

In additional or alternative examples, the UE prioritizes the cell for which the random access would be transmitted with lowest power.

In additional or alternative examples, the UE prioritizes the cell based on link budget.

In additional or alternative examples, the UE prioritizes the cell based on feature prioritization for the random access.

In additional or alternative examples, the UE prioritizes the cell for which the random access is a 2-step random access.

In additional or alternative examples, the UE prioritizes the cell for which the random access is a 4-step random access.

In additional or alternative examples, the UE prioritizes the cell for which the random access is a contention-free random access.

In additional or alternative examples, the UE prioritizes the cell for which the random access is a contention-based random access.

In additional or alternative examples, the UE prioritizes the cell based on random access resource selection (e.g., preamble index, SSB, CSI-RS, or random access preamble group).

In additional or alternative examples, the UE prioritizes the cell for which beam failure recovery timer is running or not running.

In additional or alternative examples, the UE prioritizes a cell based on random selection.

In additional or alternative examples, the UE prioritizes a cell based on round-robin selection.

In additional or alternative examples, the UE prioritizes a cell based on access barring or access control.

In additional or alternative examples, the UE prioritizes an LTM candidate cell in detriment of a RA to a serving cell when the UE has received the trigger for RACH transmission to the LTM candidate cell in response to a PDCCH order received in response to a lower layer measurement.

In additional or alternative examples, the UE prioritizes performing RA to a first LTM candidate cell in detriment of performing RA to a second LTM candidate cell when RA to the first LTM candidate cell is triggered for an LTM cell switch compared to the triggering of RA to the second LTM candidate cell being for other events (e.g., early UL sync).

In additional or alternative embodiments, the UE may use a combination of two or more of the rules for the prioritization of a cell. For example, it may prioritize a cell based on a first rule X and a second rule Y, or based on a first rule X, a second rule Y and a third rule Z, and so on.

The term "L1/L2 based inter-cell mobility" is used herein to refer to the Work Item Description in 3GPP, though the terms L1/L2 mobility, L1-mobility, L1 based mobility, L1/L2-centric inter-cell mobility, L1/L2 inter-cell mobility L1/L2-Triggered Mobility, or Lower-layer triggered Mobility are also used herein. The basic principle is that the UE receives a lower layer signaling from the network indicating to the UE a change (or switch or activation) of its serving cell (e.g., change of PCell, from a source to a target Pcell). A lower layer signaling can be a message/signaling of a lower layer protocol, which may be referred as a L1/L2 inter-cell mobility execution command or LTM cell switch command. The change of serving cell (e.g., change of Pcell) may also lead to a change in Scell(s) for the same cell group, for example, in case the command triggers the UE to change to another cell group configuration of the same type (e.g., another MCG configuration). Before the UE receives the LTM cell switch command, the UE can be configured by the network with one or more LTM candidate cell configurations (e.g., reception of an RRC Reconfiguration message, with at least one LTM candidate cell configuration) A LTM candidate cell configuration may include parameters in the IE CellGroupConfig per candidate cell and/or an embedded RRC Reconfiguration per LTM candidate cell.

The term LTM cell switch procedure can be used herein to refer to the process of a UE switching (or changing) its cell from a source cell to a target cell (which may be called here an LTM candidate cell or a neighbor cell), using L1/L2-triggered mobility (aLTM). In the context of L1/L2-triggered mobility (LTM), an LTM cell switch procedure may sometimes also be known as L1/L2 based inter-cell mobility execution, LTM execution, dynamic switch, LTM switch, (LTM) cell switch, (LTM) serving cell change or (LTM) cell change. Herein, switching to the LTM candidate cell configuration includes the UE considering that an LTM candidate cell becomes its new special cell (SpCell) e.g. Pcell in case of LTM being configured for a Master Cell Group (MCG) and/or PSCell in case of LTM being configured for a Secondary Cell Group (SCG); or, changing its SpCell from the current Pcell to an LTM candidate cell.

Even if the term change of cell is used, that may include a change of a whole cell group configuration, which includes a change in the SpCell (e.g., change of Pcell, or change of PSCell) and a change in Scells of the cell group (e.g., addition, modification and/or release of one or more Scells).

An LTM cell switch procedure may be triggered in the UE by reception of a LTM cell switch command, or alternatively, triggered by some other event, such as a condition, e.g., a triggering condition used for conditional configuration, such as conditional handover, being fulfilled, as a result of recovery from radio link failure or handover failure.

Herein a LTM candidate cell can refer to a cell the UE is configured with when configured with L1/L2-triggered mobility. That is a cell the UE can move to in a LTM cell switch procedure, upon reception of a LTM cell switch command. These cells may also be called candidate cell(s), candidates, mobility candidates, non-serving cells, additional cells, target candidate cell, target candidate, etc. A LTM candidate cell is a cell the UE perform measurements on (e.g. CSI measurements) so that the UE reports these measurements and network may take educated decision on which beam (e.g. TCI state) and/or cell the UE is to be switched to. An LTM candidate cell may be a candidate to be a target Pcell or PSCell, or an Scell of a cell group (e.g. MCG Scell).

In some embodiments, the UE has received at least one LTM candidate cell configuration. This is also sometimes referred to as a configuration of a LTM candidate cell, which may be an RRC configuration, such as encapsulated in an RRC Reconfiguration message, that the UE receives when being configured with L1/L2-Triggered Mobility. A LTM candidate cell configuration comprises the configuration in the UE needs to start to operate accordingly when it performs an LTM cell switch procedure to that LTM candidate cell e.g. upon reception of the LTM cell switch command indicating the UE to perform a LTM cell switch procedure to that LTM candidate cell, which becomes the target cell and the current (new) SpCell, or an SCell in a serving frequency. The LTM candidate cell configuration comprises parameters of a serving cell (or multiple serving cells, such as a cell group), comprising one or more of the groups of parameters, such as an RRCReconfiguration message an IE CellGroupConfig or an IE SpCellConfig (or the IE SCell-Config, in the case of a Secondary Cell). A LTM candidate cell configuration may in one example comprise one or more of: i) the PCell configuration and one or more SCell configuration(s) of a Master Cell Group (MCG); i) the PSCell configuration and one or more SCell configuration(s) of a secondary Cell Group (SCG). The terms (LTM) candidate configuration, LTM configuration, (LTM) candidate target cell configuration, (LTM) target candidate (cell) configuration may be used interchangeably when referring to LTM candidate cell configuration. An LTM candidate cell configuration is associated with an identifier which is used in the signaling when referring to a certain LTM candidate cell configuration, such as when the UE receives the LTM candidate cell configuration and when the UE receives an LTM cell switch command indicating the UE to perform a LTM cell switch procedure to that LTM candidate cell. This identifier is sometimes known as the LTM candidate cell configuration identity or LTM candidate configuration index (or similar).

The actual LTM candidate cell configuration and its exact content and/or structure of this IE and/or embedded message may be called an RRC model for the candidate configuration, or simply RRC model. An LTM candidate cell configuration comprises the configuration which the UE needs to operate accordingly when it performs (executes) L1/L2 based inter-cell mobility execution to a LTM candidate cell, upon reception of the lower layer signaling (MAC CE) indicating a L1/L2 based inter-cell mobility to a LTM candidate cell (which becomes the target cell and the current (new) PCell, or an SCell in a serving frequency), or upon reception of the lower layer signaling (MAC CE) indicating a L1/L2 based inter-cell mobility to a LTM candidate cell configuration indicated with a candidate configuration index (sometimes also denoted candidate configuration ID). The UE may be configured with multiple LTM candidate cell configurations, so a Candidate DU generates and sends to the CU multiple configuration(s). The actual LTM candidate cell configuration the UE receives during the LTM configuration may be a delta signaling to be applied on top of a reference configuration, so that the actual configuration the UE is to use in the candidate cell upon LTM cell switch is the combination of the LTM candidate cell configuration and the reference configuration (e.g. separately signaled by the network to the UE).

The text refers to that the UE has a stored LTM candidate cell configuration for an LTM candidate cell. A stored LTM candidate cell configuration for an LTM candidate cell may have been received when being configured with L1/L2-Triggered Mobility, e.g. in an RRC Reconfiguration message which includes an LTM candidate cell configuration. The stored LTM candidate cell configuration may be a combination of a received LTM candidate cell configuration (which uses delta signaling) and the reference configuration (e.g. separately signaled by the network to the UE). The stored LTM candidate cell configuration may alternatively be obtained by the UE by other means, e.g. preconfigured, a default or specified configuration, restored after exiting idle mode or a UE power saving state such as transition from RRC_INACTIVE to RRC_CONNECTED state, read from a memory card or by other means been provided out-of-band outside of 3GPP specified interfaces or as user data.

The text refers to cell to be prioritized for initiating the random access procedure. In this case, the random access procedure may be triggered autonomously by the UE, or is the network that indicates to the UE to initiate the random access procedure.

An example of when the UE initiate autonomously the random access procedure to a serving cell (e.g. PCell) is upon the detection of a radio link failure (RLF) in the PCell, when the UE triggers the RRC re-establishment procedure which implies at least one of: the UE detects a failure event; the UE selects a suitable cell to which initiate the random access procedure; the UE initiate the random access procedure to the selected cell; the UE sends the RRC re-establishment request to the network; the Network sends an RRC re-establishment to the UE; and the UE sends an RRC re-establishment complete to the network.

In some embodiments, a trigger to initiate the RA procedure to a serving cell includes a Declaration of a Beam Failure Detection (BFD) at a serving cell (e.g. PCell, SpCell of the SCG, SpCell of the MCG), triggering the UE to perform Beam Failure Recovery (BFR), triggering a RA procedure to the serving cell. In some examples, this may be considered as a UE-triggered RA procedure (autonomous), since it is not a network command which triggers RA.

In additional or alternative embodiments, a trigger to initiate the RA procedure to a serving cell includes the need to transmit Uplink (UL) data in a serving cell (e.g. PCell) for which the UE is not UL synchronized e.g. the UE does not have a valid Time Alignment and/or a Time alignment timer for that serving cell has expired; This may be called UL data arrival during RRC Connected. In some examples, this may be considered as a UE-triggered RA procedure (autonomous), since it is not a network command which triggers RA.

In additional or alternative embodiments, a trigger to initiate the RA procedure to a serving cell includes the reception of a message from the network (e.g. an RRCReconfiguration) to perform a Reconfiguration with Sync procedure e.g. intra-cell handover/intra-cell reconfiguration with sync. In some examples, this may be considered as a network-triggered RA procedure, since it is triggered by a message the UE receives from the network.

In additional or alternative embodiments, a trigger to initiate the RA procedure to a serving cell includes the reception of a command from the network (e.g. PDCCH order to perform a RA procedure for re-gaining UL sync e.g. when network detects that the UL sync is lost with the UE. In some examples, this may be considered as a network-triggered RA procedure, since it is triggered by a message the UE receives from the network.

In additional or alternative embodiments, a trigger to initiate the RA procedure to a serving cell includes the need to transit a request to obtain on demand system information.

In additional or alternative embodiments, a trigger to initiate the RA procedure to a serving cell includes for positioning purposes during RRC_CONNECTED requiring RA, e.g., when timing advance is needed for UE positioning.

An example on when the network indicates to the UE to initiates a random access procedure to an LTM candidate cell is when the network triggers the UE to perform an early UL sync procedure which implies at least one of: the network sends a Physical Downlink Control Channel (PDCCH) order to the UE indicating an LTM candidate cell; the UE initiates a random access procedure towards the indicated LTM candidate cell and sends a random access preamble; and the network calculates a Timing Advance (TA) value and store it until an LTM cell switch command (which includes the calculated TA) is sent to the UE.

In additional or alternative examples, the trigger to initiate the RA procedure to an LTM candidate cell may be one or more of the following: 1) The reception of a command for performing LTM cell switch to an LTM candidate cell (e.g. MAC CE for LTM cell switch including the LTM configuration Identity) requiring a RA procedure during LTM cell switch e.g. a cell for which the UE does not have an UL sync; 2) The reception of a command (PDCCH order) for performing RA preamble transmission to an LTM cell switch e.g. for establishing UL sync, so the network can calculate a Timing Advance (TA) value; 3) The reception of a command (PDCCH order) for performing RA preamble re-transmission with and/or without power ramping, to an LTM cell switch e.g. for establishing UL sync, so the network can calculate a Timing Advance (TA) value; or 4) The reception of a command (PDCCH order) for performing RA preamble transmission or re-transmission with and/or without power ramping, to an LTM cell switch, for re-establishing UL sync, so the network can re-calculate a Timing Advance (TA) value.

Further, the scenario targeted in these innovations includes when the UE is instructed or determined to trigger more than one random access procedure toward more than one cell, either at the same time and/or when a second RA procedure is triggered while a first RA had been initiated but not completed. In such a case, since no more than one random access procedure can be handled by the UE at a given time, a prioritization is needed.

In some embodiments, the innovations include a UE implemented procedure. For simplicity, the "network" can be referred to as a network entity or network node from which the UE receives one or more configurations and/or parameters, such as LTM candidate configuration(s)

In some embodiments, the UE is configured with at least one serving cell and at least one LTM candidate cell. Then, in response to a first trigger to initiate a first RA procedure and a least a second trigger to initiate a second RA procedure, the UE prioritizes one of the triggered RA procedure(s) for continuing a RA procedure, according to one or more rules.

In additional or alternative embodiments, the first RA procedure is on a serving cell and the second RA procedure is on an LTM candidate cell. In some examples, the UE initiates the first RA procedure on a serving cell (e.g. PCell) and, before that first RA procedure is completed (e.g. before the UE transmits a RA preamble and/or before the UE receives a Random Access Response and/or before the UE receives a msg4 for Contention Resolution), a second RA is triggered to an LTM candidate cell e.g. the UE receives a PDCCH order for performing early UL to that LTM candidate cell.

In additional or alternative embodiments, the first RA procedure is on an LTM candidate cell and the second RA procedure is on a serving cell. In some examples, the UE initiates the first RA procedure on an LTM candidate cell (e.g. by receiving a PDCCH order for performing early UL to that LTM candidate cell) and before that first RA procedure is completed (e.g. before the UE transmits a RA preamble, and/or before the UE receives a TA value and/or before the UE receives an LTM cell switch command and/or Random Access Response and/or before the UE receives a msg4 for Contention Resolution), a second RA is triggered to a serving cell.

In additional or alternative embodiments, the first RA procedure is on a first LTM candidate cell and the second RA procedure is on a second LTM candidate cell. In some examples, the UE initiates the first RA procedure on a first LTM candidate cell (e.g. by receiving a PDCCH order for performing early UL to that LTM candidate cell) and before that first RA procedure is completed (e.g. before the UE transmits a RA preamble, and/or before the UE receives a TA value and/or before the UE receives an LTM cell switch command and/or Random Access Response and/or before the UE receives a msg4 for Contention Resolution), a second RA is triggered to a second LTM candidate cell (e.g. by receiving a PDCCH order for performing early UL to that second LTM candidate cell).

In additional or alternative embodiments, the UE prioritizes one of the triggered RA procedures by aborting or stopping the first RA procedure and performing the second RA procedure, In some examples, the second RA procedure is triggered while the first RA procedure is ongoing and/or it had been initiated but it had not been completed. In additional or alternative examples, the UE aborting a first RA procedure, initiated at the UE when at to the UE has been triggered to perform RA to a cell X and the first available RA resource for cell X is at t0+T, and before t0+T, the UE receives another trigger to perform RA to a cell Y, which according to the one or more rules shall be prioritized, so that the UE aborts the first RA procedure with cell X (i.e. it aborts the transmission of a RA preamble to cell X) and initiates the RA procedure to cell Y.

Consider an example in which the first RA procedure is on an LTM candidate cell and the second RA procedure is on a serving cell. In this example, the UE receives a PDCCH order for performing early UL sync to an LTM candidate cell (first RA procedure) which triggers a first RA procedure and, before the UE transmits a preamble to the LTM candidate cell (according to a RA configuration of the LTM candidate cell) and/or even before the UE performs measurements (e.g. SSB measurements, such as SS-RSRP or L1-RSRP measurements) for RA resource selection (see TS 38.321 for further details), the UE may declare a BFD for the PCell (which leads to BFR and requires RA to the PCell), which triggers a second RA procedure before the first RA procedure is completed. In this example, the UE prioritizes the second RA procedure, which means that the UE aborts the first RA to the LTM candidate cell (less critical than a BFD in the PCell), which means that a rule for prioritization in this example is that when the first RA is triggered to an LTM candidate cell for early UL sync, and before that is completed the UE triggers a second RA to the PCell due to a BFD (leading to BFR and RA), the UE prioritizes the second RA procedure to the PCell by aborting the first RA procedure to the LTM candidate cell. One consequence is that the UE would be able to recover the connection with the PCell as soon as possible, which could prevent a radio link failure (RLF) and and RRC Re-establishment initiation with the PCell: if that RLF would have happened in the PCell, the early UL sync with an LTM candidate cell would possibly be wasted anyways, since the UE would release LTM configurations when it performs an RRC re-establishment procedure. After the UE succeeds in performing the BFR due to BFD, the UE may re-initiate the first RA procedure or wait for an action from the network: for example, after the network sent the PDCCH order triggering the first RA procedure and was not able to detect the expected preamble (since the UE has not transmitted the preamble for the first RA procedure yet), the network may trigger a re-transmission of that preamble or re-start the procedure by sending another PDCCH order.

Consider an additional or alternative example in which the first RA procedure is on a serving cell and the second RA procedure is on an LTM candidate cell. In this example, the UE declares a BFD with the PCell which leads to a BFR and a first RA procedure (that this is something internal at the UE, i.e., the first RA procedure is not triggered by the network). Then, before that first RA procedure is completed (e.g. before the transmits the RA preamble to the PCell for BFR), the UE receives a PDCCH order for triggering a second RA procedure on an LTM candidate cell. However, as the first RA procedure is triggered due to BFD and BFR to the PCell, and that is not completed, the second RA procedure is aborted i.e. the UE does not transmit the preamble for the second RA procedure and might receive another PDCCH order from the network later on, after it has completed the first RA procedure. In this example, the UE prioritizes the first RA procedure, which means that the UE aborts the second RA to the LTM candidate cell (less critical than a BFD in the PCell), which means that a rule for prioritization in this example is that when the first RA is triggered to a serving cell (e.g. PCell) due to BFD and BFR, and before that is completed the UE triggers a second RA to an LTM candidate cell for early UL sync, the UE prioritizes the first RA procedure to the PCell by aborting the second RA procedure to the LTM candidate cell.

Consider an additional or alternative example in which the first RA procedure is on a serving cell and the second RA procedure is on an LTM candidate cell. In this example, the UE declares a BFD with the PCell which leads to a BFR and a first RA procedure (that this is something internal at the UE, i.e., the first RA procedure is not triggered by the network). Then, before that first RA procedure is completed (e.g. before the transmits the RA preamble to the PCell for BFR), the UE receives a lower layer signaling for LTM cell switching (e.g. MAC CE including the LTM candidate Identifier for an LTM candidate cell), triggering a second RA procedure on the indicated LTM candidate cell (or an RRC message for a reconfiguration with sync). In this example the UE aborts the first RA procedure triggered due to BFD and BFR to the PCell and prioritizes the second RA procedure to the LTM candidate cell for LTM cell switch. In this example, a rule for prioritization in is that when the first RA is triggered to a serving cell (e.g. PCell, due to BFD and BFR), and before that is completed the UE triggers a second RA to an LTM candidate cell for triggering an LTM cell switch (or an RRC message for a reconfiguration with sync), the UE prioritizes the second RA procedure to the LTM candidate cell by aborting the first RA procedure to the PCell.

Consider an additional or alternative example in which which the first RA procedure is on a first LTM candidate cell and the second RA procedure is on a second LTM candidate cell. In this example, the UE initiates the first RA procedure on a first LTM candidate cell (e.g. by receiving a PDCCH order for performing early UL to that LTM candidate cell) and before that first RA procedure is completed (e.g. before the UE transmits a RA preamble, and/or before the UE receives a TA value and/or before the UE receives an LTM cell switch command and/or Random Access Response and/or before the UE receives a msg4 for Contention Resolution), a second RA is triggered to a second LTM candidate cell (e.g. by receiving a MAC CE for LTM cell switch) in response to which the UE aborts the first RA procedure and performs the second RA procedure.

In additional or alternative embodiments, the UE prioritizes one of the triggered RA procedures by pausing, suspending, or postponing the first RA procedure and performing the second RA procedure. The second RA procedure can be triggered while the first RA procedure is ongoing and/or it had been initiated but it had not been completed. Pausing, suspending, or delaying, instead of aborting comprises a follow up action for the procedure e.g. re-initiation, resuming or initiating it later. In other words, in response to suspending, delaying, or postponing the first RA procedure and performing the second RA procedure, the UE may resume or initiate the first RA procedure after the second RA procedure is completed or successfully completed. In some examples, the UE postponing, pausing or delaying a first RA procedure (and possibly resuming it later), initiated at the UE when at to the UE has been triggered to perform RA to a cell X and the first available RA resource for cell X is at t0+T, and before t0+T (i.e. between to and t0+T), the UE receives another trigger to perform RA to a cell Y, which according to the one or more rules shall be prioritized, so that the UE suspends/pauses the first RA procedure with cell X, initiates the RA procedure to cell Y, and after that is concluded, the UE resumes the first RA procedure towards cell X, by transmitting the preamble to the RA resource of cell X available after the UE has transmitted the preamble to cell Y.

Consider an additional or alternative example in which the first RA procedure is on an LTM candidate cell and the second RA procedure is on a serving cell. In this example, the UE receives a PDCCH order for performing early UL sync to an LTM candidate cell (first RA procedure) which triggers a first RA procedure and, before the UE transmits a preamble to the LTM candidate cell (according to a RA configuration of the LTM candidate cell) and/or even before the UE performs measurements (e.g. SSB measurements, such as SS-RSRP or L1-RSRP measurements) for RA resource selection (see TS 38.321 for further details), the UE may declare a BFD for the PCell (which leads to BFR and requires RA to the PCell), which triggers a second RA procedure before the first RA procedure is completed. Based on that the UE prioritizes the second RA procedure, which means that the UE pauses (suspend or postpones) the first RA to the LTM candidate cell The UE would be able to recover the connection with the PCell as soon as possible, which could prevent a radio link failure (RLF) and RRC Re-establishment initiation with the PCell. After the UE succeeds in performing the BFR due to BFD (e.g. reception of a RAR and/or a msg4 for contention resolution), the UE resumes the first RA procedure, by transmitting the RA preamble to the LTM candidate cell e.g. in the next available RA resource of the LTM candidate cell. In one option, the procedure is instead aborted in case there is no resource available after the first RA procedure is completed.

Consider an additional or alternative example in which the first RA procedure is on a serving cell and the second RA procedure is on an LTM candidate cell. In this example, the UE declares a BFD with the PCell which leads to a BFR and a first RA procedure (that this is something internal at the UE, i.e., the first RA procedure is not triggered by the network). Then, before that first RA procedure is completed (e.g. before the transmits the RA preamble to the PCell for BFR), the UE receives a PDCCH order for triggering a second RA procedure on an LTM candidate cell. However, as the first RA procedure is triggered due to BFD and BFR to the PCell, and that is not completed, the second RA procedure is paused or suspended i.e. the UE pauses the transmission of the preamble for the second RA procedure until the UE has completed the first RA procedure, assuming there is still a RA resource available for the second RA procedure with the LTM candidate cell after the first RA procedure is completed.

In an additional or alternative embodiments, the UE prioritizing a triggered RA procedure includes prioritizing the RA procedure on a serving cell, in detriment to a RA procedure on at least one LTM candidate cell. As disclosed in a previous example, the UE may prioritize a RA procedure in the PCell (e.g. due to a BFD leading to a BFR, due to a PDCCH order for re-gaining UL sync) which is triggered while there is an ongoing RA procedure with an LTM candidate cell (e.g. before the UE transmitted the preamble for that RA procedure).

In additional or alternative embodiments, prioritizing the RA procedure on a first LTM candidate cell in detriment of the RA procedure on one or more of the other LTM candidate cell (not the first LTM candidate cell). In some examples, the UE may prioritize a RA procedure in a first LTM candidate cell when that is for an LTM cell switch (upon reception of a lower layer signaling e.g. MAC CE including an LTM candidate identifier) and/or a reconfiguration with sync (upon reception of an RRC Reconfiguration including a reconfigurationWithSync), in detriment of a RA procedure in a second LTM candidate cell for early UL sync. In additional or alternative examples, the UE may prioritize a RA procedure triggered for early UL sync in a first LTM candidate cell in the same frequency (or subcarrier spacing) as the PCell, in detriment of a RA procedure triggered for early UL sync in a second LTM candidate cell which is not in the same frequency (or subcarrier spacing) as the PCell.

In additional or alternative embodiments, prioritizing an LTM candidate cell in detriment of a serving cell or a serving cell type (e.g., SCells, SCell of the MCG, SCells of the SCG). In some examples, the UE may prioritize a RA procedure in an LTM candidate in detriment of a RA procedure in a serving cell when the serving cell is an SCell.

In additional or alternative embodiments, the UE, in response to a trigger to initiate a random access procedure to the serving cell and one or more LTM candidate cell, prioritize a random access procedure to initiate, wherein the UE prioritize a cell (serving cell or one of the LTM candidate cells) on where to initiate a random access procedure, according to one or more rules. Once determined toward which cell the random access procedure needs to be initiated, the UE transmits a random access preamble towards the selected cell and, in response, it may receive a random access response.

In additional or alternative embodiments, the UE prioritizes one cell out of the serving cell and one or more LTM candidate cell(s) towards which to initiate the random access procedure according to one or more rules.

Examples of the rules are described below.

Example Rule 1: the UE prioritizes a serving cell in case a random access procedure is triggered towards the serving cell (regardless on whether a random access procedure is triggered towards one or more LTM candidate cell(s)). In some embodiments, if one of the cells towards which a random access procedure needs to be initiated is the serving cell, the UE prioritizes the initiation of the random access procedure towards the serving cell. This rule is applied no matter what are the conditions or criteria on why a random access procedure is triggered towards a cell that is not the serving cell. In some examples, UE initiates a RA procedure on a serving cell and before that is completed the UE triggers a second RA in an LTM candidate cell, and in response to it, the UE prioritizes the RA procedure in the serving cell e.g. by pausing, aborting, suspend the RA procedure in the LTM candidate cell. In additional or alternative examples, the UE initiates a RA procedure on an LTM candidate cell and before that is completed the UE triggers a second RA in a serving cell, and in response to it, the UE prioritizes the RA procedure in the serving cell e.g. by pausing, aborting, suspend the RA procedure in the LTM candidate cell.

In some embodiments, the UE receives a PDCCH order for performing early UL sync to an LTM candidate cell (first RA procedure) which triggers a first RA procedure and, before the UE transmits a preamble to the LTM candidate cell (according to a RA configuration of the LTM candidate cell) and/or even before the UE performs measurements (e.g. SSB measurements, such as SS-RSRP or L1-RSRP measurements) for RA resource selection (see TS 38.321 for further details), the UE triggers a second RA procedure in a serving cell (e.g. UL data transmission in the PCell when time alignment timer expired, BFD leading to BFR, intra-cell handover, etc.) before the first RA procedure is completed. In response, the UE prioritizes the second RA procedure (considering that procedures in the serving cells are more critical for the UE's performance. The rule for prioritization in this case may be expressed as: when the first RA is triggered to an LTM candidate cell for early UL sync, and before that is completed the UE triggers a second RA in a serving cell (e.g. PCell, SCell i of the Master Cell Group, SCell of the Secondary Cell Group), the UE prioritizes the second RA procedure to the serving cell (e.g. by aborting the first RA procedure to the LTM candidate cell).

One benefit of Example Rule 1 is that RA procedures in serving cells are typically more critical for the overall UE performance e.g. to request UL resources for UL data transmission in a serving cell when the UE is not in UL sync (time alignment timer expired), re-gain UL sync with a serving cell, recover the connection with the PCell in case of BFD/BFR (preventing an RLF and RRC Re-establishment), etc. Another benefit is the simplicity of prioritizing a serving regardless of the event which triggers RA in a serving cell and/or the type of serving cell (e.g. whether that is a RA procedure in a PCell, PSCell, SCell of the MCG, SCell of the SCG).

Example Rule 2: the UE prioritizes a cell for which the random access procedure is triggered due to a failure event (e.g., radio link failure, beam failure). In some embodiments, the UE prioritizes the initiation of the random access procedure towards a cell in case the random access procedure has been triggered as a result of a recovery procedure from a failure event. In such a case, a failure event can be related to e.g., a radio link failure, an LTM cell switch failure, BFD which leads to BFR, an handover failure, or CHO failure. In case of a radio link failure, one or more of the following criteria may trigger the failure: Expiration of a timer e.g. timer T310; Reaching a maximum number of retransmissions e.g. RLC re-transmissions; Reaching a maximum number of out of sync indications; or Reconfiguration failure.

In some examples, the UE initiates a RA procedure triggered by a failure (e.g. BFD and BFR) and before that is completed the UE triggers a second RA (not triggered by a failure e.g. for early UL sync), and in response to it, the UE prioritizes the RA procedure triggered by a failure by pausing, aborting, suspend the RA procedure not triggered by a failure.

In additional or alternative examples, the UE initiates a RA procedure not triggered by a failure and before that is completed the UE triggers a second RA triggered by a failure, and in response to it, the UE prioritizes the RA procedure triggered by a failure e.g. by pausing, aborting, suspend the RA procedure not triggered by a failure.

In some embodiments, the UE receives a PDCCH order for performing early UL sync to an LTM candidate cell (first RA procedure) which triggers a first RA procedure and, before the UE transmits a preamble to the LTM candidate cell (according to a RA configuration of the LTM candidate cell) and/or even before the UE performs measurements (e.g. SSB measurements, such as SS-RSRP or L1-RSRP measurements) for RA resource selection (see TS 38.321 for further details), the UE triggers a second RA procedure in a serving cell due to a BFD leading to a BFR before the first RA procedure is completed. In response, the UE prioritizes the second RA procedure, considering that BFR in the PCell is more critical for the UE's performance. The rule for prioritization in this case may be expressed as: when the first RA is triggered to an LTM candidate cell for early UL sync, and before that is completed the UE triggers a second RA in the PCell for BFR, the UE prioritizes the second RA procedure to the PCell for BFR e.g. by aborting the first RA procedure to the LTM candidate cell, so the UE re-covers the connection as soon as possible.

In additional or alternative embodiments, the UE detects a failure in the PCell (e.g. BFD and BFR) and triggers a first RA procedure and before that is completed or successfully complete (e.g. before preamble transmission) the UE receives a PDCCH order for performing early UL sync to an LTM candidate cell, which triggers a second RA procedure. In response, the UE prioritizes the first RA procedure and continues with it, considering that BFR in the PCell is more critical for the UE's performance, by aborting, pausing or postponing the second RA procedure to the LTM candidate cell, so the UE re-covers the connection as soon as possible.

One benefit of Example Rule 2 is that RA procedures triggered by failure, especially in the PCell, are more critical for the overall UE performance and, the main connection is recovered as soon as possible. There would be no point in establishing early UL to an LTM candidate cell in case the UE triggers an RLF with the PCell, because that would lead to an RRC re-establishment in which the UE anyways deletes the LTM related configurations.

Example Rule 3: the UE prioritizes a cell for which the random access procedure is triggered due to an early UL sync procedure. In some embodiments, the UE prioritizes the initiation of the random access procedure towards a cell in case the random access procedure has been triggered to initiate an early UL sync procedure. This rule is applied no matter what are the conditions or criteria on why a random access procedure which is not for an early UL sync procedure is triggered towards a cell.

In additional or alternative embodiments, in which this rule provide benefits to the UE, is when the UE initiates a RA procedure triggered for early UL to an LTM candidate cell (e.g. by reception of a PDCCH order) and, before that RA procedure is completed, the UE triggers a second RA (e.g. triggered internally at the UE, due a failure event like BFD and BFR in the PCell), and in response to it, the UE prioritizes the first RA procedure for early UL sync by pausing, aborting, or suspending the second RA procedure. This makes sense and has benefits, for example, when the UE had already switched its transceiver to the LTM candidate cell for the transmission of the preamble and/or has already performed SSB measurements for RA resource selection (even if the UE has not yet transmitted the preamble), so that switching back to the PCell and aborting the RA procedure with the LTM candidate cell could be costly, instead of prioritizing the RA preamble transmission to the LTM candidate cell and quickly getting back to the PCell after preamble transmission, since there is no expected RAR in the LTM candidate cell (another reason to continue with the RA procedure with the LTM candidate cell).

An additional sub-rule here could be that the UE prioritizes the RA to the LTM candidate cell for early UL sync in case that had been initiated and had already switched to transmit the preamble to the LTM candidate cell, when it triggered the second RA procedure.

An additional or alternative sub-rule could be that the UE prioritizes the RA to the serving cell in case the RA to the LTM candidate cell had been initiated but the UE had not switched yet to the LTM candidate cell to transmit the preamble to the LTM candidate cell, when it triggered the second RA procedure.

An additional or alternative sub-rule could be that the UE prioritizes the RA to the LTM candidate cell for early UL sync in case that had been initiated and the number of time units the UE needs to wait for transmitting the RA preamble to the LTM candidate cell is shorter than a threshold (e.g. X radio frames, X subframes, X OFDM symbols, X seconds, X milliseconds, etc.), wherein the time units to be waited are counted from the time instance in which the UE triggers the second RA procedure to the serving cell.

Example Rule 4: if the network indicates to the UE to initiate more than one random access procedure toward more than one cell, the UE prioritize a cell based on the order for which the indication to initiate the random access procedure has been received. In some embodiments, the UE prioritize the initiation of the random access procedure according to the order in which the initiation of the random access procedure has been received or determined. For instance, if the network instructs the UE to initiate the random access procedure towards Cell A and Cell B and the indication for Cell B is received before the indication of Cell A, then the UE prioritize the initiation of the random access procedure towards cell B first.

In some examples, the indication of initiating the random access procedure towards Cell A and Cell B may be sent by the network either within the same message or in separate messages. In case the two indications are sent within the same messages, the UE prioritizes the one that decode first, or the one that is first in the list of notification, or the one whose field appear first in the RRC ASN. 1 structure that is part of the message.

In additional or alternative examples, the UE completes an n-th RA procedure which had been triggered before it initiates an (n+1)-th RA procedure when both the n-th RA procedure and the (n+1)-th procedure had been triggered by the network (e.g. PDCCH order). In one example, this is performed for the same type of the multiple RA procedure(s). For example, when the UE receives multiple PDCCH orders triggering an early UL sync for LTM candidate cell(s), the UE performs the RA to LTM candidate cells in the order in which the PDCCH orders associated to an LTM candidate cell were received e.g. when the UE gets PDCCH order to LTM candidate (A) at t0, and when the UE gets PDCCH order to LTM candidate (B) at t1, the UE initiates a RA procedure at t0 and completes it, and after that it initiates the RA procedure for the LTM candidate (B).

In some embodiments, one exception for this rule (i.e. in which the UE does not follow the order in which the RA procedures have been triggered) is when the triggers are for different cell types e.g. LTM candidate cell and serving cell. For example, the UE receives at to a PDCCH order for early UL sync with an LTM candidate cell and before that is completed the UE receives at t1 a PDCCH order for re-establishing UL sync with the PCell, and in response to that, the UE aborts the first RA procedure with the LTM candidate cell to initiate the RA procedure for the PCell, even if that one was triggered later.

Example Rule 5: the UE prioritizes a cell based on L1 measurements e.g., SS-RSRP. In some embodiments, the UE prioritizes a cell for which it sent the latest (most recent) L1 measurement report. The benefit is that the UE prioritize a cell with good radio conditions which speeds up the access, saves power, increases the chances for the random access procedure to not fail. In some examples, the so-called L1 measurements and/or lower layer measurements, such as SS-RSRP (as define din TS 38.215) or L1-RSRP, may be associated to a first RA procedure and/or a second RA procedure.

In additional or alternative embodiments, when a first RA procedure is triggered for a PCell, the UE performs one or more SSB measurements on the PCell before it performs RA resource selection (so an SSB is mapped to a RA resource in the RACH configuration). In one sub-rule, when at least one SSB of the PCell has a measurement (e.g. SS-RSRP, L1-RSRP) above an SSB threshold in a RACH configuration for the PCell associated to the first RA procedure (e.g. RACH configuration for BFR, in case the first RA procedure is triggered due to BFR), the UE prioritizes the RA procedure with the PCell.

In additional or alternative embodiments, when the previous condition is not fulfilled for the PCell, but it is fulfilled for the LTM candidate cell i.e. the UE performs one or more SSB measurements on the LTM candidate cell before it performs RA resource selection (so an SSB is mapped to a RA resource in the RACH configuration) and at least one SSB of the LTM candidate cell is above an SSB threshold in a RACH configuration for the LTM candidate cell associated to the second RA procedure (e.g. RACH configuration for early UL sync), the UE prioritizes the RA procedure with the LTM candidate cell.

A benefit with Example Rule 5 can include that the UE prioritizes the RA procedure which has higher chances to be successfully completed faster, because when the UE prioritizes the RA procedure whose RA resource is selected based on an SSB whose measurements (e.g. SS-RSRP, L1-RSRP) are above the configured threshold for that RA procedure, the chances are higher that there would be no need for preamble re-transmissions and/or power ramping, i.e., that procedure would be likely to end faster compared to a RA procedure based on a RA resource selected based on an SSB whose SSB measurements are not above the SSB threshold in the corresponding RACH configuration.

In additional or alternative embodiments, when the condition in embodiment (a) is not fulfilled for the PCell, the condition for one of the above embodiments is also not fulfilled for the LTM candidate cell, the UE prioritizes the RA with the PCell.

In additional or alternative embodiments, when a first RA procedure is triggered for a PCell, the UE performs one or more SSB measurements on the PCell before it performs RA resource selection (so an SSB is mapped to a RA resource in the RACH configuration). When the SSB of the PCell with strongest measurement (e.g. strongest SS-RSRP, strongest L1-RSRP) is stronger than the SSB with strongest measurement of the LTM candidate cell (e.g. strongest SS-RSRP, strongest L1-RSRP) the UE prioritizes the RA procedure with the PCell. In other words, when the UE trigger the RA procedure with the LTM candidate cell and before that is completed the UE triggers a second RA procedure with the PCell and the strongest SSB of the PCell is stronger than the strongest SSB of the LTM candidate cell, the UE prioritizes the PCell.

In additional or alternative embodiments, when a first RA procedure is triggered for a first LTM candidate cell, the UE performs one or more SSB measurements on the first LTM candidate cell before it performs RA resource selection (so an SSB is mapped to a RA resource in the RACH configuration). When the SSB of the first LTM candidate cell with strongest measurement (e.g. strongest SS-RSRP, strongest L1-RSRP) is stronger than the SSB with strongest measurement of a second LTM candidate cell (e.g. strongest SS-RSRP, strongest L1-RSRP) for which RA has also been initiated before the first RA procedure is completed, the UE prioritizes the RA procedure with the LTM candidate cell whose SSB has the strongest measurement.

Example Rule 6: the UE prioritizes a cell based on L3 measurements e.g., cell-based RSRP. In some embodiments, the UE prioritize a cell for which has performed the latest L3 measurements. The benefit is that the UE prioritize a cell with good radio conditions which speeds up the access, saves power, increases the chances for the random access procedure to not fail. In some examples, The so-called L3 measurements may corresponds to cell-based RSRP, cell-based RSRQ or cell-based SINR (as defined in TS 38.331), wherein cel quality is derived based on one or more SSB measurements of a cell e.g. by averaging multiple SSB measurements and/or considering the strongest SSB measurements as the cell based measurements.

In some embodiments, when a first RA procedure is triggered for a PCell, the UE derives the cell based measurement for the PCell (e.g. RSRP) before it transmits the RA preamble for the first RA procedure in the PCell. In one sub-rule, when the cell based measurement is above a threshold the UE prioritizes the RA procedure with the PCell.

In additional or alternative embodiments, the UE prioritizes the cell with strongest cell based measurement e.g. the cell with strongest RSRP. For example, when the first RA procedure is triggered for the PCell and before that is completed the UE triggers a second RA with an LTM candidate cell, and the LTM candidate cell measurement is stronger than the PCell, the UE prioritizes the RA procedure with the LTM candidate cell e.g. by aborting, postponing and/or suspending the first RA procedure with the PCell, and transmitting a RA preamble to the LTM candidate cell for the second RA procedure.

Example Rule 7: the UE prioritize the strongest cell out of "N" cells, according to a measurement quantity, wherein a measurement quantity may correspond to RSRP, RSRQ, SINR. A benefit of Example Rule 7 includes that the UE prioritize a cell with good radio conditions which speeds up the access since the chances of a successful random access is higher when the cell has a stronger measurement quantity. The reason is that a stronger cell in the DL has likely a stronger UL, i.e., the transmitted preamble with the initial power configured in the RACH configuration has higher chances to succeed in its first transmission, compared to a preamble transmission in a cell whose measurement quantity (e.g. RSRP) is not as good (e.g. retransmissions with power ramping may be required), which may lead to longer delays to complete the random access procedure.

In addition, Example Rule 7 may also save UE power, because of the lower need for preamble re-transmissions with power ramping. In addition, because of less need of preamble re-transmissions it increases the chances for the random access procedure to not fail.

A sub-option can include the measurement quantity being pre-defined e.g. UE uses RSRP; or UE uses L1-RSRP; or UE uses SINR. In some examples, the UE prioritize the suitable LTM candidate cell with strongest measurement quantity (e.g. RSRP), wherein the measurement quantity used is the one which has been configured in the lower layer measurement reports (e.g. set in a report quantity parameter such as reportQuantity).

In an additional or alternative sub-option, the UE first prioritize one or more cell(s) which are suitable and, among the suitable selected cells, the UE selects the cell with the highest measurement quantity e.g. highest RSRP, highest RSRQ, highest SINR.

In some examples, when the UE prioritize one cell out of multiple cells according to one or more rules, it may use a combination of two or more of the rules for the prioritization of a cell. For example, it may prioritize a cell based on a first rule X and a second rule Y, or based on a first rule X, a second rule Y and a third rule Z, and so on. Referring to the rules above, the UE may for example prioritize a cell based on a first rule. Corresponding combinations of other rules can be performed that will result in new rules.

Example Rule 8: the UE prioritizes the cell for which it has most recently performed a random access. In some embodiments, the UE prioritize a cell for which it has most recently performed transmission of a random access preamble. The benefit is that for this cell, there is already a random access procedure ongoing and this transmission may therefore be a retransmission. If the UE does not perform this retransmission of a preamble it would be more likely for this random access procedure to fail due to timeout or that the number of attempts has exceeded a certain limit.

In additional or alternative embodiments, the UE prioritizes a re-transmission of a preamble in a first RA procedure in detriment to an initial preamble transmission in a second RA procedure. In one example, the UE receives at t0 a PDCCH order to trigger a RA procedure for early UL sync with an LTM candidate cell and transmits a preamble associated to that RA procedure. Then, the UE triggers a second RA procedure, and before a preamble is transmitted for that second RA procedure, the UE triggers a re-transmission of a preamble associated to the first RA procedure. In that case, the UE prioritizes the re-transmission of a preamble (e.g. with power ramping and/or with a new RA resource selection, possibly to a different beam, SSB or CSI-RS), e.g., by transmitting (or re-transmitting) a preamble for the first RA procedure and postponing (suspending, delaying, aborting) the transmission of a preamble for the second RA procedure.

Example Rule 9: the UE prioritizes the cell for which it has least recently performed a random access. In some embodiments, the UE prioritize a cell for which it has least recently performed a random access. One example is that this random access would correspond to a first preamble transmission or alternatively that the interval between retransmissions are longer for this certain cell and random access procedure than for others. The benefit for prioritizing this cell is that if multiple retransmission would need to be performed (including possible power ramping), starting earlier would increase the possibility for it to succeed before a certain time limit (for example, for an LTM candidate cell, the random access to establish early UL sync that takes longer time may delay a LTM cell switch or may force the network to use random access-based LTM).

Example Rule 10: the UE prioritizes the cell for which it has initiated a random access procedure and is about to perform a random access preamble retransmission. In some embodiments, the UE prioritize a cell for which it has already initiated a random access procedure and this transmission is therefore a retransmission. The benefit is that for this cell, there is already a random access procedure ongoing and this transmission may therefore be a retransmission. If the UE does not perform this retransmission of a preamble it would be more likely for this random access procedure to fail due to timeout or that the number of attempts has exceeded a certain limit.

Example Rule 11: the UE prioritizes the cell for which it performs a first random access preamble transmission. In some embodiments, the UE prioritize a cell for which it performs the first preamble transmission. The benefit for prioritizing this cell is that if multiple retransmission would need to be performed (including possible power ramping), starting earlier would increase the possibility for it to succeed before a certain time limit (for example, for an LTM candidate cell, the random access to establish early UL sync that takes longer time may delay a LTM cell switch or may force the network to use random access-based LTM).

Example Rule 12: the UE prioritizes the cell for which the random access would be transmitted with highest power. In some embodiments, the UE prioritize a cell for which the UE would use highest transmission power of the preamble. One example is that power ramping has already been performed so this transmission is more likely to succeed than transmissions with less power.

Example Rule 13: the UE prioritizes the cell for which the random access would be transmitted with lowest power. In some embodiments, the UE prioritize a cell for which the UE would use lowest transmission power of the preamble. One benefit is that the UE saves power and it reduces the overall interference in the system. Another benefit for prioritizing this cell is that if multiple retransmission would need to be performed (including possible power ramping), starting earlier would increase the possibility for it to succeed before a certain time limit (for example, for an LTM candidate cell, the random access to establish early UL sync that takes longer time may delay a LTM cell switch or may force the network to use random access-based LTM).

Example Rule 14: the UE prioritizes the cell based on link budget. In some embodiments, the UE prioritize a cell based on link budget determined by the UE for the preamble transmission. For example, the UE prioritizes the cell for which the transmission has the least power loss. The benefit is that less power would be used and it reduces the overall interference in the system.

Example Rule 15: the UE prioritizes the cell based on feature prioritization for the random access. In some embodiments, the UE prioritize a cell for which the random access resource is associated with a priority for a feature, such as priority for RedCap, Slicing, SDT and MSG3-Repetition for coverage enhancements.

Example Rule 16: the UE prioritizes the cell for which the random access is a 2-step random access. In some embodiments, the UE prioritize a cell for which the random access is a 2-step random access. The benefit is that 2-step random access is faster and thus any other random access may start earlier.

Example Rule 17: the UE prioritizes the cell for which the random access is a 4-step random access. In some embodiments, the UE prioritize a cell for which the random access is a 4-step random access. The benefit is that 4-step random access takes longer time to complete and may suffer from delays.

Example Rule 18: the UE prioritizes the cell for which the random access is a contention-free random access. In some embodiments, the UE prioritize a cell for which the random access is a contention-free random access. The benefit is that a contention-free random access is faster and thus any other random access may start earlier.

Example Rule 19: the UE prioritizes the cell for which the random access is a contention-based random access. In some embodiments, the UE prioritize a cell for which the random access is a contention-based random access. The benefit is that contention-based random access takes longer time to complete and may suffer from delays.

Example Rule 20: the UE prioritizes the cell based on random access resource selection, e.g. preamble index, SSB, CSI-RS, random access preamble group. In some embodiments, the UE prioritize a cell based on resource used for the random access. For example, which preamble index is used (UE may select the cell with highest or lowest index), which SSB is used (e.g. use the cell with highest or lowest SSB index), which preamble group is used (UE may use preamble group A instead of B or vice versa), etc. The benefit is that the UE behavior is deterministic and there is a way for the network to control it in some way via the resources that are assigned.

Example Rule 21: the UE prioritizes the cell for which beam failure recovery timer is running or not running. In some embodiments, the UE prioritize a cell based on beam failure recovery status for that cell. For example, the UE may prioritize a cell for which no beam failure is ongoing and benefit is that the random access is more likely to succeed. Or for example, the UE may prioritize a cell for which bean failure recovery is about to happen or even ongoing and that may result is that the connection to that cell is recovered.

Example Rule 22: the UE prioritizes a cell based on random selection. In some embodiments, the UE prioritize a cell based on a random number. For example, the UE draws a random number X uniformly distributed between 0 . . . 1. If X is above a certain threshold, e.g. 0.5, the UE prioritizes a serving cell and otherwise it prioritizes a non-serving cell. In this approach, all cells may be treated equally.

Example Rule 23: the UE prioritizes a cell based on round-robin selection. In some embodiments, the UE prioritize a cell based on round-robin. For example, every second time the UE prioritizes a serving cell and every other second time a non-serving cell (e.g. an LTM candidate cell). In another example, the UE prioritizes based on a strict order, among the serving and non-serving cells to make sure all cells are treated equally in the long term.

Example Rule 24: the UE prioritizes a cell based on access barring or access control. In some embodiments, the UE prioritize a cell based on access barring or access control, such as for unified access control (UAC), the access category, access identity, barring factor associated with the access attempt for which the random access belongs. The benefit is that access attempts which are not barred or already have undergone access barring check are allowed and also attempts that have higher probability to pass access barring check is prioritized over those with lower probability.

Example Rule 25: the UE prioritizes a RA procedure which had been initiated when the time the UE needs to wait for transmitting the preamble for that RA procedure is below a threshold. In some embodiments, the UE prioritizes a first RA procedure to the LTM candidate cell for early UL sync (instead of initiating a second RA procedure to a serving cell triggered before the first RA procedure is completed) when the UE had initiated the first Ra procedure and the number of time units the UE needs to wait for transmitting the RA preamble to the LTM candidate cell is shorter than a number of time units 'X' (e.g. X radio frames, X subframes, X OFDM symbols, X seconds, X milliseconds, etc.), wherein the time units to be waited are counted from the time instance in which the UE triggers the second RA procedure to the serving cell.

Example Rule 26: the UE prioritizes a RA procedure based on the frequency of the cell to which the RA procedure is to be performed. In some embodiments, the UE prioritizes a RA procedure to the LTM candidate cell when that LTM candidate cell has the same frequency (e.g. SSB frequency, point A frequency, subcarrier spacing) as the PCell. This would mean that the UE prioritizes intra-frequency procedures, since there would require shorter times to switch back and forth in the UE's transceivers. For example, when the UE triggers a first RA procedure to an LTM candidate cell in a frequency which is not the PCell's frequency and before the preamble is transmitted for that procedure the UE triggers a second RA procedure to an LTM candidate cell in the same frequency as the PCell, the UE prioritizes the second RA procedure. In one sub-example, the UE prioritize the second Ra procedure only when it has not yet switch its transceiver to the frequency of the LTM candidate in a frequency different that the PCell's frequency.

Operations of the communication device QQ200 (implemented using the structure of FIG. 8) will now be discussed with reference to the flow chart of FIG. 6 according to some embodiments of inventive concepts. For example, modules may be stored in memory QQ210 of FIG. 8, and these modules may provide instructions so that when the instructions of a module are executed by respective communication device processing circuitry QQ202, communication device QQ200 performs respective operations of the flow chart.

Figure 6:
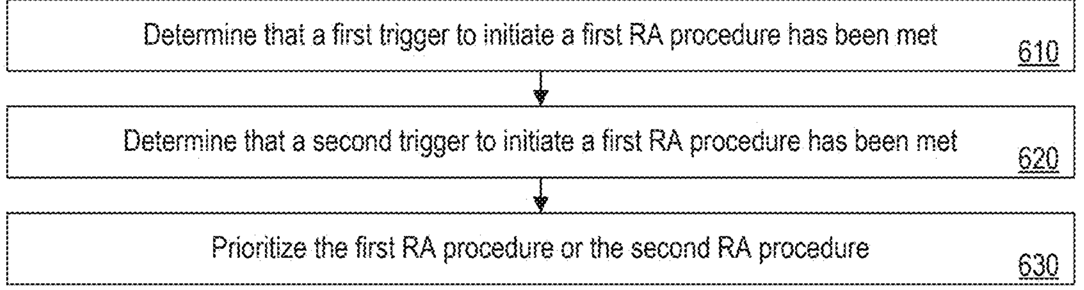
FIG. 6 is a flow chart illustrating an example of operations performed by a UE in accordance with some embodiments.

FIG. 6 illustrates an example of operations performed by a communication device to prioritize between multiple RA procedures.

At block 610, processing circuitry QQ202 determines that a first trigger to initiate a first RA procedure has been met.

At block 620, processing circuitry QQ202 determines that a second trigger to initiate a second RA procedure has been met. In some embodiments, the communication device determines that the second trigger has been met subsequent to determining that the first trigger has been met and prior to completing the first RA procedure.

At block 630, processing circuitry QQ202 prioritizes the first RA procedure or the second RA procedure.

The processing circuitry QQ202 prioritizes the first RA procedure or the second RA procedure based on one or more prioritization rules. The one or more prioritization rules include at least one of: prioritize the RA procedure associated with a serving cell;

- prioritize the RA procedure that is triggered due to a failure event;
- prioritize the RA procedure that is triggered due to an early UL sync procedure;
- prioritize the RA procedure based on an order for which the indication to initiate the RA procedures is received;
- prioritize the RA procedure based on L1 measurements;
- prioritize the RA procedure based on L3 measurements;
- prioritize the RA procedure based on a strongest cell out of "N" cells, according to a measurement quantity;
- prioritize the RA procedure associated with a cell based on when the communication last performed a random access procedure with the cell;
- prioritize the RA procedure for which the communication device has initiated a random access procedure and is about to perform a random access preamble retransmission;
- prioritize the RA procedure for which it performs a first random access preamble transmission;
- prioritize the RA procedure for which the random access would be transmitted with highest power;
- prioritize the RA procedure for which the random access would be transmitted with lowest power;
- prioritize the RA procedure based on link budget;
- prioritize the RA procedure based on feature prioritization for the random access;
- prioritize the RA procedure for which the random access is a 2-step random access;
- prioritize the RA procedure for which the random access is a 4-step random access;
- prioritize the RA procedure for which the random access is a contention-free random access;
- prioritize the RA procedure for which the random access is a contention-based random access;
- prioritize the RA procedure based on random access resource selection;
- prioritize the RA procedure for which beam failure recovery timer is running or not running;
- prioritize the RA procedure based on random selection;
- prioritize the RA procedure based on round-robin selection;
- prioritize the RA procedure based on access barring or access control;
- prioritize the RA procedure associated with a LTM candidate cell in detriment of a RA to a serving cell when the UE has received the trigger for RACH transmission to the LTM candidate cell in response to a PDCCH order received in response to a lower layer measurement; and
- prioritize performing RA to a first LTM candidate cell in detriment of performing RA to a second LTM candidate cell when RA to the first LTM candidate cell is triggered for an LTM cell switch compared to the triggering of RA to the second LTM candidate cell being for other events.

Various operations from the flow chart of FIG. 6 may be optional with respect to some embodiments of communication devices and related methods.

In some embodiments the determining that the second trigger has been met comprises determining that the second trigger has been met prior to the first RA occasion.

In some embodiments the first RA occasion is the first RA occasion available during which the first RA preamble could be scheduled to be transmitted as part of the first RA procedure.

Figure 7:
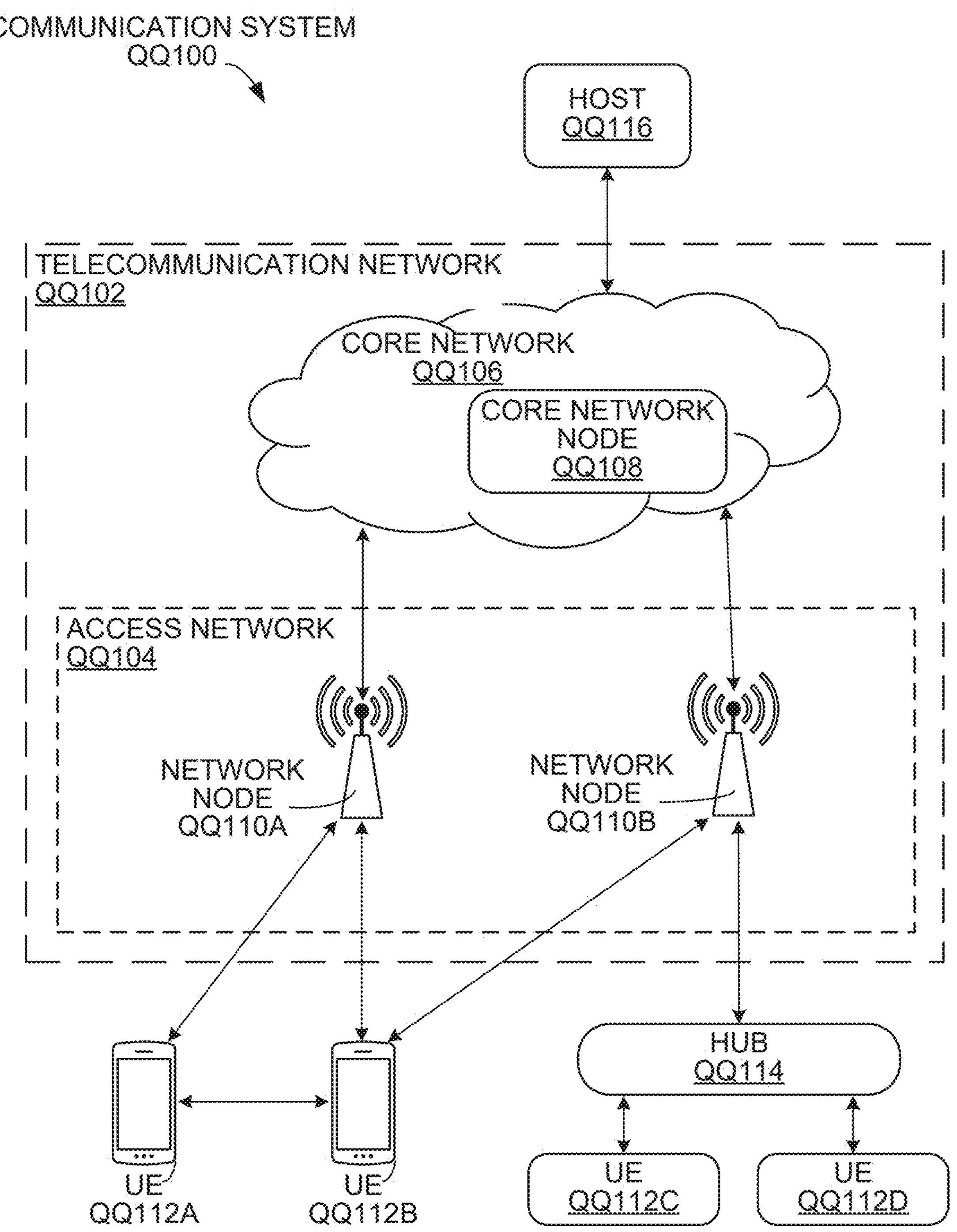
FIG. 7 is a block diagram of a communication system in accordance with some embodiments.

FIG. 7 shows an example of a communication system QQ100 in accordance with some embodiments.

In the example, the communication system QQ100 includes a telecommunication network QQ102 that includes an access network QQ104, such as a radio access network (RAN), and a core network QQ106, which includes one or more core network nodes QQ108. The access network QQ104 includes one or more access network nodes, such as network nodes QQ110*a* and QQ110*b* (one or more of which may be generally referred to as network nodes QQ110), or any other similar 3rd Generation Partnership Project (3GPP) access node or non-3GPP access point. Moreover, as will be appreciated by those of skill in the art, the network nodes QQ110 are not necessarily limited to an implementation in which a radio portion and a baseband portion are supplied and integrated by a single vendor. Thus, it will be understood that the network nodes QQ110 may include disaggregated implementations or portions thereof. For example, in some embodiments, the telecommunication network QQ102 includes one or more Open-RAN (ORAN) network nodes. An ORAN network node is a node in the telecommunication network QQ102 that supports an ORAN specification (e.g., a specification published by the O-RAN Alliance, or any similar organization) and may operate alone or together with other nodes to implement one or more functionalities of any node in the telecommunication network QQ102, including one or more network nodes QQ110 and/or core network nodes QQ108.

Examples of an ORAN network node include an open radio unit (O-RU), an open distributed unit (O-DU), an open central unit (O-CU), including an O-CU control plane (O-CU-CP) or an O-CU user plane (O-CU-UP), a RAN intelligent controller (near-real time or non-real time) hosting software or software plug-ins, such as a near-real time RAN control application (e.g., xApp) or a non-real time RAN automation application (e.g., rApp), or any combination thereof (the adjective "open" designating support of an ORAN specification). The network node may support a specification by, for example, supporting an interface defined by the ORAN specification, such as an A1, F1, W1, E1, E2, X2, Xn interface, an open fronthaul user plane interface, or an open fronthaul management plane interface. Intents and content-aware notifications described herein may be communicated from a 3GPP network node or an ORAN network node over 3GPP-defined interfaces (e.g., N2, N3) and/or ORAN Alliance-defined interfaces (e.g., A1, O1). Moreover, an ORAN network node may be a logical node in a physical node. Furthermore, an ORAN network node may be implemented in a virtualization environment (described further below) in which one or more network functions are virtualized. For example, the virtualization environment may include an O-Cloud computing platform orchestrated by a Service Management and Orchestration Framework via an O-2 interface defined by the O-RAN Alliance. The network nodes QQ110 facilitate direct or indirect connection of user equipment (UE), such as by connecting wireless devices QQ112*a*, QQ112*b*, QQ112*c*, and QQ112*d* (one or more of which may be generally referred to as UEs QQ112) to the core network QQ106 over one or more wireless connections. The network nodes QQ110 facilitate direct or indirect connection of user equipment (UE), such as by connecting UEs QQ112*a*, QQ112*b*, QQ112*c*, and QQ112*d* (one or more of which may be generally referred to as UEs QQ112) to the core network QQ106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system QQ100 may include any number of wired or wireless networks, network nodes, UEs, and/or any other components or systems that may facilitate or participate in the communication of data and/or signals whether via wired or wireless connections. The communication system QQ100 may include and/or interface with any type of communication, telecommunication, data, cellular, radio network, and/or other similar type of system.

The UEs QQ112 may be any of a wide variety of communication devices, including wireless devices arranged, configured, and/or operable to communicate wirelessly with the network nodes QQ110 and other communication devices. Similarly, the network nodes QQ110 are arranged, capable, configured, and/or operable to communicate directly or indirectly with the UEs QQ112 and/or with other network nodes or equipment in the telecommunication network QQ102 to enable and/or provide network access, such as wireless network access, and/or to perform other functions, such as administration in the telecommunication network QQ102.

In the depicted example, the core network QQ106 connects the network nodes QQ110 to one or more hosts, such as host QQ116. These connections may be direct or indirect via one or more intermediary networks or devices. In other examples, network nodes may be directly coupled to hosts. The core network QQ106 includes one more core network nodes (e.g., core network node QQ108) that are structured with hardware and software components. Features of these components may be substantially similar to those described with respect to the UEs, network nodes, and/or hosts, such that the descriptions thereof are generally applicable to the corresponding components of the core network node QQ108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host QQ116 may be under the ownership or control of a service provider other than an operator or provider of the access network QQ104 and/or the telecommunication network QQ102, and may be operated by the service provider or on behalf of the service provider. The host QQ116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system QQ100 of FIG. 7 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network QQ102 is a cellular network that implements 3GPP standardized features. Accordingly, the telecommunications network QQ102 may support network slicing to provide different logical networks to different devices that are connected to the telecommunication network QQ102. For example, the telecommunications network QQ102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs QQ112 are configured to transmit and/or receive information without direct human interaction. For instance, a UE may be designed to transmit information to the access network QQ104 on a predetermined schedule, when triggered by an internal or external event, or in response to requests from the access network QQ104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub QQ114 communicates with the access network QQ104 to facilitate indirect communication between one or more UEs (e.g., UE QQ112*c* and/or QQ112*d*) and network nodes (e.g., network node QQ110*b*). In some examples, the hub QQ114 may be a controller, router, content source and analytics, or any of the other communication devices described herein regarding UEs. For example, the hub QQ114 may be a broadband router enabling access to the core network QQ106 for the UEs. As another example, the hub QQ114 may be a controller that sends commands or instructions to one or more actuators in the UEs. Commands or instructions may be received from the UEs, network nodes QQ110, or by executable code, script, process, or other instructions in the hub QQ114. As another example, the hub QQ114 may be a data collector that acts as temporary storage for UE data and, in some embodiments, may perform analysis or other processing of the data. As another example, the hub QQ114 may be a content source. For example, for a UE that is a VR headset, display, loudspeaker or other media delivery device, the hub QQ114 may retrieve VR assets, video, audio, or other media or data related to sensory information via a network node, which the hub QQ114 then provides to the UE either directly, after performing local processing, and/or after adding additional local content. In still another example, the hub QQ114 acts as a proxy server or orchestrator for the UEs, in particular in if one or more of the UEs are low energy IoT devices.

The hub QQ114 may have a constant/persistent or intermittent connection to the network node QQ110*b*. The hub QQ114 may also allow for a different communication scheme and/or schedule between the hub QQ114 and UEs (e.g., UE QQ112*c* and/or QQ112*d*), and between the hub QQ114 and the core network QQ106. In other examples, the hub QQ114 is connected to the core network QQ106 and/or one or more UEs via a wired connection. Moreover, the hub QQ114 may be configured to connect to an M2M service provider over the access network QQ104 and/or to another UE over a direct connection. In some scenarios, UEs may establish a wireless connection with the network nodes QQ110 while still connected via the hub QQ114 via a wired or wireless connection. In some embodiments, the hub QQ114 may be a dedicated hub—that is, a hub whose primary function is to route communications to/from the UEs from/to the network node QQ110*b*. In other embodiments, the hub QQ114 may be a non-dedicated hub—that is, a device which is capable of operating to route communications between the UEs and network node QQ110*b*, but which is additionally capable of operating as a communication start and/or end point for certain data channels.

Figure 8:
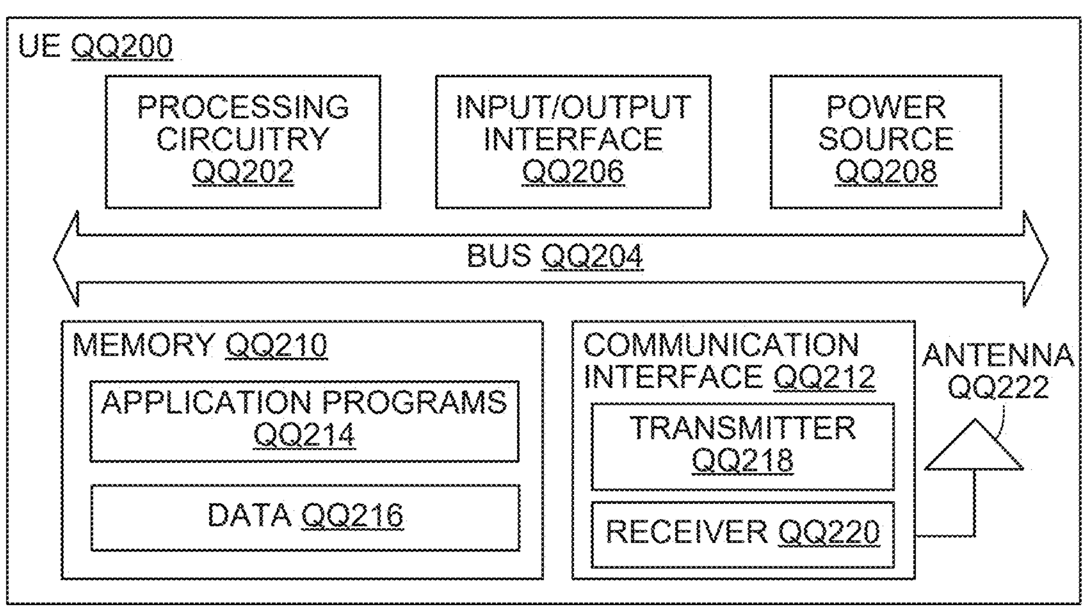
FIG. 8 is a block diagram of a user equipment in accordance with some embodiments.

FIG. 8 shows a UE QQ200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE QQ200 includes processing circuitry QQ202 that is operatively coupled via a bus QQ204 to an input/output interface QQ206, a power source QQ208, a memory QQ210, a communication interface QQ212, and/or any other component, or any combination thereof. Certain UEs may utilize all or a subset of the components shown in FIG. 8. The level of integration between the components may vary from one UE to another UE. Further, certain UEs may contain multiple instances of a component, such as multiple processors, memories, transceivers, transmitters, receivers, etc.

The processing circuitry QQ202 is configured to process instructions and data and may be configured to implement any sequential state machine operative to execute instructions stored as machine-readable computer programs in the memory QQ210. The processing circuitry QQ202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry QQ202 may include multiple central processing units (CPUs).

In the example, the input/output interface QQ206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE QQ200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source QQ208 is structured as a battery or battery pack. Other types of power sources, such as an external power source (e.g., an electricity outlet), photovoltaic device, or power cell, may be used. The power source QQ208 may further include power circuitry for delivering power from the power source QQ208 itself, and/or an external power source, to the various parts of the UE QQ200 via input circuitry or an interface such as an electrical power cable. Delivering power may be, for example, for charging of the power source QQ208. Power circuitry may perform any formatting, converting, or other modification to the power from the power source QQ208 to make the power suitable for the respective components of the UE QQ200 to which power is supplied.

The memory QQ210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory QQ210 includes one or more application programs QQ214, such as an operating system, web browser application, a widget, gadget engine, or other application, and corresponding data QQ216. The memory QQ210 may store, for use by the UE QQ200, any of a variety of various operating systems or combinations of operating systems.

The memory QQ210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory QQ210 may allow the UE QQ200 to access instructions, application programs and the like, stored on transitory or non-transitory memory media, to off-load data, or to upload data. An article of manufacture, such as one utilizing a communication system may be tangibly embodied as or in the memory QQ210, which may be or comprise a device-readable storage medium.

The processing circuitry QQ202 may be configured to communicate with an access network or other network using the communication interface QQ212. The communication interface QQ212 may comprise one or more communication subsystems and may include or be communicatively coupled to an antenna QQ222. The communication interface QQ212 may include one or more transceivers used to communicate, such as by communicating with one or more remote transceivers of another device capable of wireless communication (e.g., another UE or a network node in an access network). Each transceiver may include a transmitter QQ218 and/or a receiver QQ220 appropriate to provide network communications (e.g., optical, electrical, frequency allocations, and so forth). Moreover, the transmitter QQ218 and receiver QQ220 may be coupled to one or more antennas (e.g., antenna QQ222) and may share circuit components, software or firmware, or alternatively be implemented separately.

In the illustrated embodiment, communication functions of the communication interface QQ212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface QQ212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE QQ200 shown in FIG. 8.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 9:
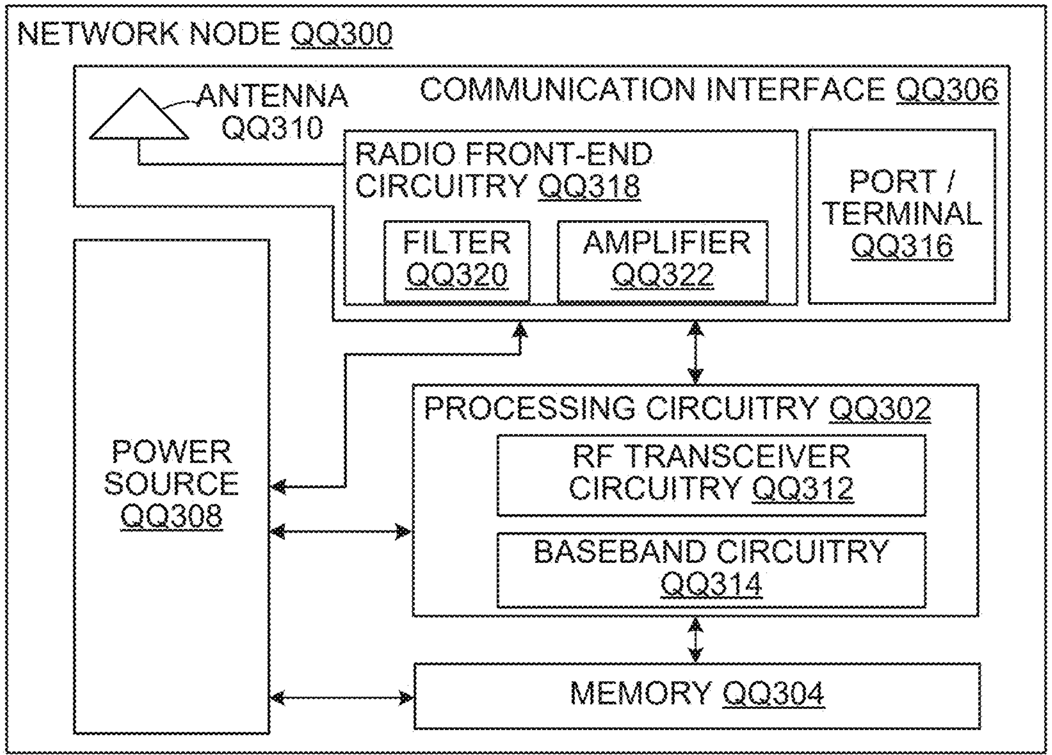
FIG. 9 is a block diagram of a network node in accordance with some embodiments.

FIG. 9 shows a network node QQ300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs), NR NodeBs (gNBs)), O-RAN nodes, or components of an O-RAN node (e.g., intelligent controller, O-RU, O-DU, O-CU).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node QQ300 includes a processing circuitry QQ302, a memory QQ304, a communication interface QQ306, and a power source QQ308. The network node QQ300 may be composed of multiple physically separate components (e.g., a NodeB component and a RNC component, or a BTS component and a BSC component, etc.), which may each have their own respective components. In certain scenarios in which the network node QQ300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node QQ300 may be configured to support multiple radio access technologies (RATs). In such embodiments, some components may be duplicated (e.g., separate memory QQ304 for different RATs) and some components may be reused (e.g., a same antenna QQ310 may be shared by different RATs). The network node QQ300 may also include multiple sets of the various illustrated components for different wireless technologies integrated into network node QQ300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node QQ300.

The processing circuitry QQ302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ300 components, such as the memory QQ304, to provide network node QQ300 functionality.

In some embodiments, the processing circuitry QQ302 includes a system on a chip (SOC). In some embodiments, the processing circuitry QQ302 includes one or more of radio frequency (RF) transceiver circuitry QQ312 and baseband processing circuitry QQ314. In some embodiments, the radio frequency (RF) transceiver circuitry QQ312 and the baseband processing circuitry QQ314 may be on separate chips (or sets of chips), boards, or units, such as radio units and digital units. In alternative embodiments, part or all of RF transceiver circuitry QQ312 and baseband processing circuitry QQ314 may be on the same chip or set of chips, boards, or units.

The memory QQ304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry QQ302. The memory QQ304 may store any suitable instructions, data, or information, including a computer program, software, an application including one or more of logic, rules, code, tables, and/or other instructions capable of being executed by the processing circuitry QQ302 and utilized by the network node QQ300. The memory QQ304 may be used to store any calculations made by the processing circuitry QQ302 and/or any data received via the communication interface QQ306. In some embodiments, the processing circuitry QQ302 and memory QQ304 is integrated.

The communication interface QQ306 is used in wired or wireless communication of signaling and/or data between a network node, access network, and/or UE. As illustrated, the communication interface QQ306 comprises port(s)/terminal (s) QQ316 to send and receive data, for example to and from a network over a wired connection. The communication interface QQ306 also includes radio front-end circuitry QQ318 that may be coupled to, or in certain embodiments a part of, the antenna QQ310. Radio front-end circuitry QQ318 comprises filters QQ320 and amplifiers QQ322. The radio front-end circuitry QQ318 may be connected to an antenna QQ310 and processing circuitry QQ302. The radio front-end circuitry may be configured to condition signals communicated between antenna QQ310 and processing circuitry QQ302. The radio front-end circuitry QQ318 may receive digital data that is to be sent out to other network nodes or UEs via a wireless connection. The radio front-end circuitry QQ318 may convert the digital data into a radio signal having the appropriate channel and bandwidth parameters using a combination of filters QQ320 and/or amplifiers QQ322. The radio signal may then be transmitted via the antenna QQ310. Similarly, when receiving data, the antenna QQ310 may collect radio signals which are then converted into digital data by the radio front-end circuitry QQ318. The digital data may be passed to the processing circuitry QQ302. In other embodiments, the communication interface may comprise different components and/or different combinations of components.

In certain alternative embodiments, the network node QQ300 does not include separate radio front-end circuitry QQ318, instead, the processing circuitry QQ302 includes radio front-end circuitry and is connected to the antenna QQ310. Similarly, in some embodiments, all or some of the RF transceiver circuitry QQ312 is part of the communication interface QQ306. In still other embodiments, the communication interface QQ306 includes one or more ports or terminals QQ316, the radio front-end circuitry QQ318, and the RF transceiver circuitry QQ312, as part of a radio unit (not shown), and the communication interface QQ306 communicates with the baseband processing circuitry QQ314, which is part of a digital unit (not shown).

The antenna QQ310 may include one or more antennas, or antenna arrays, configured to send and/or receive wireless signals. The antenna QQ310 may be coupled to the radio front-end circuitry QQ318 and may be any type of antenna capable of transmitting and receiving data and/or signals wirelessly. In certain embodiments, the antenna QQ310 is separate from the network node QQ300 and connectable to the network node QQ300 through an interface or port.

The antenna QQ310, communication interface QQ306, and/or the processing circuitry QQ302 may be configured to perform any receiving operations and/or certain obtaining operations described herein as being performed by the network node. Any information, data and/or signals may be received from a UE, another network node and/or any other network equipment. Similarly, the antenna QQ310, the communication interface QQ306, and/or the processing circuitry QQ302 may be configured to perform any transmitting operations described herein as being performed by the network node. Any information, data and/or signals may be transmitted to a UE, another network node and/or any other network equipment.

The power source QQ308 provides power to the various components of network node QQ300 in a form suitable for the respective components (e.g., at a voltage and current level needed for each respective component). The power source QQ308 may further comprise, or be coupled to, power management circuitry to supply the components of the network node QQ300 with power for performing the functionality described herein. For example, the network node QQ300 may be connectable to an external power source (e.g., the power grid, an electricity outlet) via an input circuitry or interface such as an electrical cable, whereby the external power source supplies power to power circuitry of the power source QQ308. As a further example, the power source QQ308 may comprise a source of power in the form of a battery or battery pack which is connected to, or integrated in, power circuitry. The battery may provide backup power should the external power source fail.

Embodiments of the network node QQ300 may include additional components beyond those shown in FIG. 9 for providing certain aspects of the network node's functionality, including any of the functionality described herein and/or any functionality necessary to support the subject matter described herein. For example, the network node QQ300 may include user interface equipment to allow input of information into the network node QQ300 and to allow output of information from the network node QQ300. This may allow a user to perform diagnostic, maintenance, repair, and other administrative functions for the network node QQ300.

Figure 10:
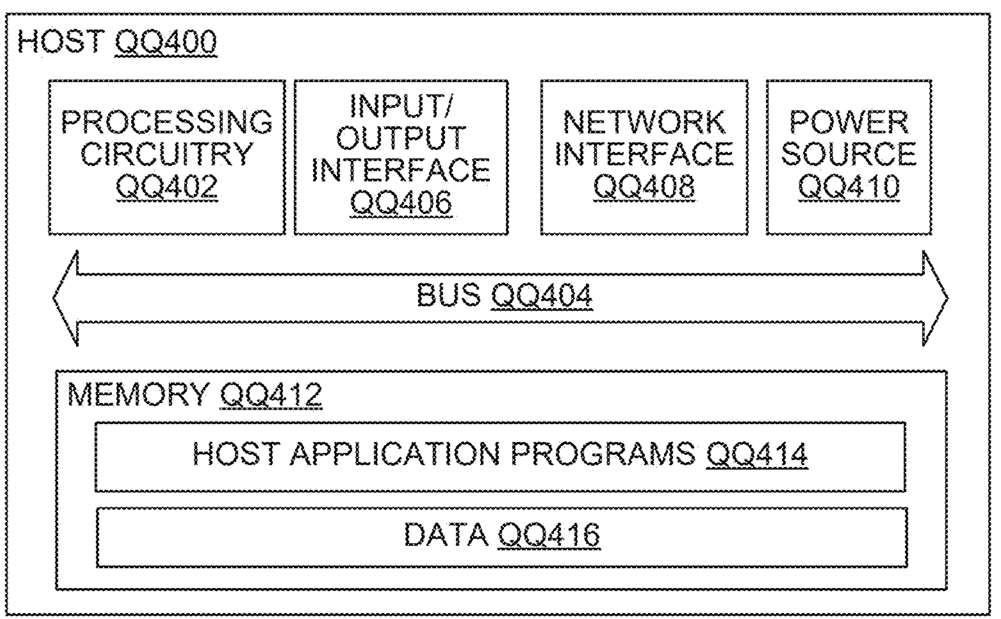
FIG. 10 is a block diagram of a host, which may be an embodiment of the host of FIG. 7, in accordance with some embodiments.

FIG. 10 is a block diagram of a host QQ400, which may be an embodiment of the host QQ116 of FIG. 7, in accordance with various aspects described herein. As used herein, the host QQ400 may be or comprise various combinations hardware and/or software, including a standalone server, a blade server, a cloud-implemented server, a distributed server, a virtual machine, container, or processing resources in a server farm. The host QQ400 may provide one or more services to one or more UEs.

The host QQ400 includes processing circuitry QQ402 that is operatively coupled via a bus QQ404 to an input/output interface QQ406, a network interface QQ408, a power source QQ410, and a memory QQ412. Other components may be included in other embodiments. Features of these components may be substantially similar to those described with respect to the devices of previous figures, such as Figures QQ2 and QQ3, such that the descriptions thereof are generally applicable to the corresponding components of host QQ400.

The memory QQ412 may include one or more computer programs including one or more host application programs QQ414 and data QQ416, which may include user data, e.g., data generated by a UE for the host QQ400 or data generated by the host QQ400 for a UE. Embodiments of the host QQ400 may utilize only a subset or all of the components shown. The host application programs QQ414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs QQ414 may also provide for user authentication and licensing checks and may periodically report health, routes, and content availability to a central node, such as a device in or on the edge of a core network. Accordingly, the host QQ400 may select and/or indicate a different host for over-the-top services for a UE. The host application programs QQ414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 11:
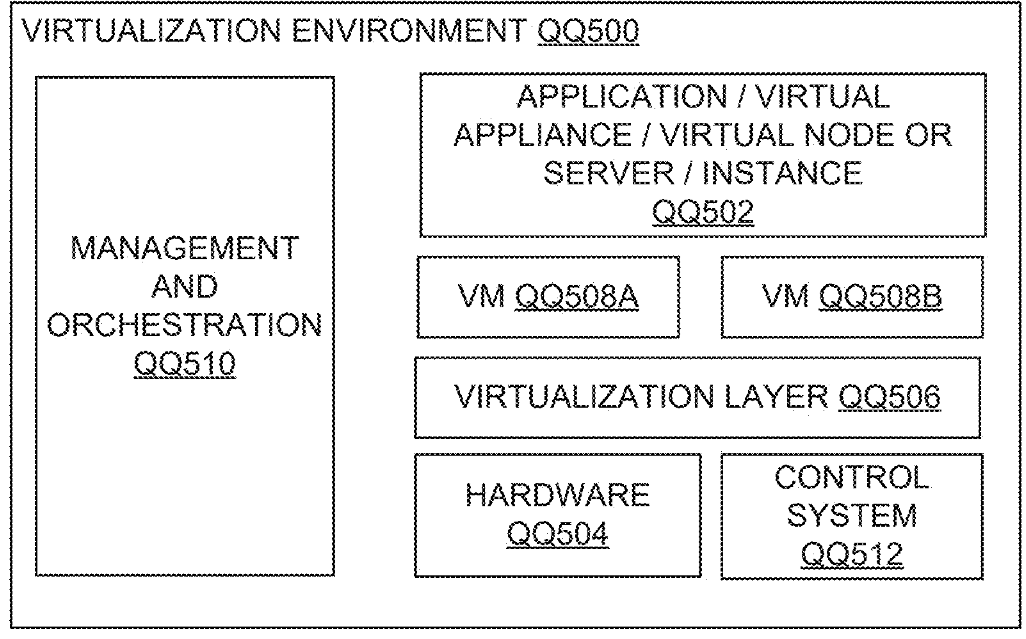
FIG. 11 is a block diagram of a virtualization environment in accordance with some embodiments.

FIG. 11 is a block diagram illustrating a virtualization environment QQ500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments QQ500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized. In some embodiments, the virtualization environment QQ500 includes components defined by the O-RAN Alliance, such as an O-Cloud environment orchestrated by a Service Management and Orchestration Framework via an O-2 interface.

Applications QQ502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware QQ504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers QQ506 (also referred to as hypervisors or virtual machine monitors (VMMs)), provide VMs QQ508*a* and QQ508*b* (one or more of which may be generally referred to as VMs QQ508), and/or perform any of the functions, features and/or benefits described in relation with some embodiments described herein. The virtualization layer QQ506 may present a virtual operating platform that appears like networking hardware to the VMs QQ508.

The VMs QQ508 comprise virtual processing, virtual memory, virtual networking or interface and virtual storage, and may be run by a corresponding virtualization layer QQ506. Different embodiments of the instance of a virtual appliance QQ502 may be implemented on one or more of VMs QQ508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM QQ508 may be a software implementation of a physical machine that runs programs as if they were executing on a physical, non-virtualized machine. Each of the VMs QQ508, and that part of hardware QQ504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs QQ508 on top of the hardware QQ504 and corresponds to the application QQ502.

Hardware QQ504 may be implemented in a standalone network node with generic or specific components. Hardware QQ504 may implement some functions via virtualization. Alternatively, hardware QQ504 may be part of a larger cluster of hardware (e.g. such as in a data center or CPE) where many hardware nodes work together and are managed via management and orchestration QQ510, which, among others, oversees lifecycle management of applications QQ502. In some embodiments, hardware QQ504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system QQ512 which may alternatively be used for communication between hardware nodes and radio units.

Figure 12:
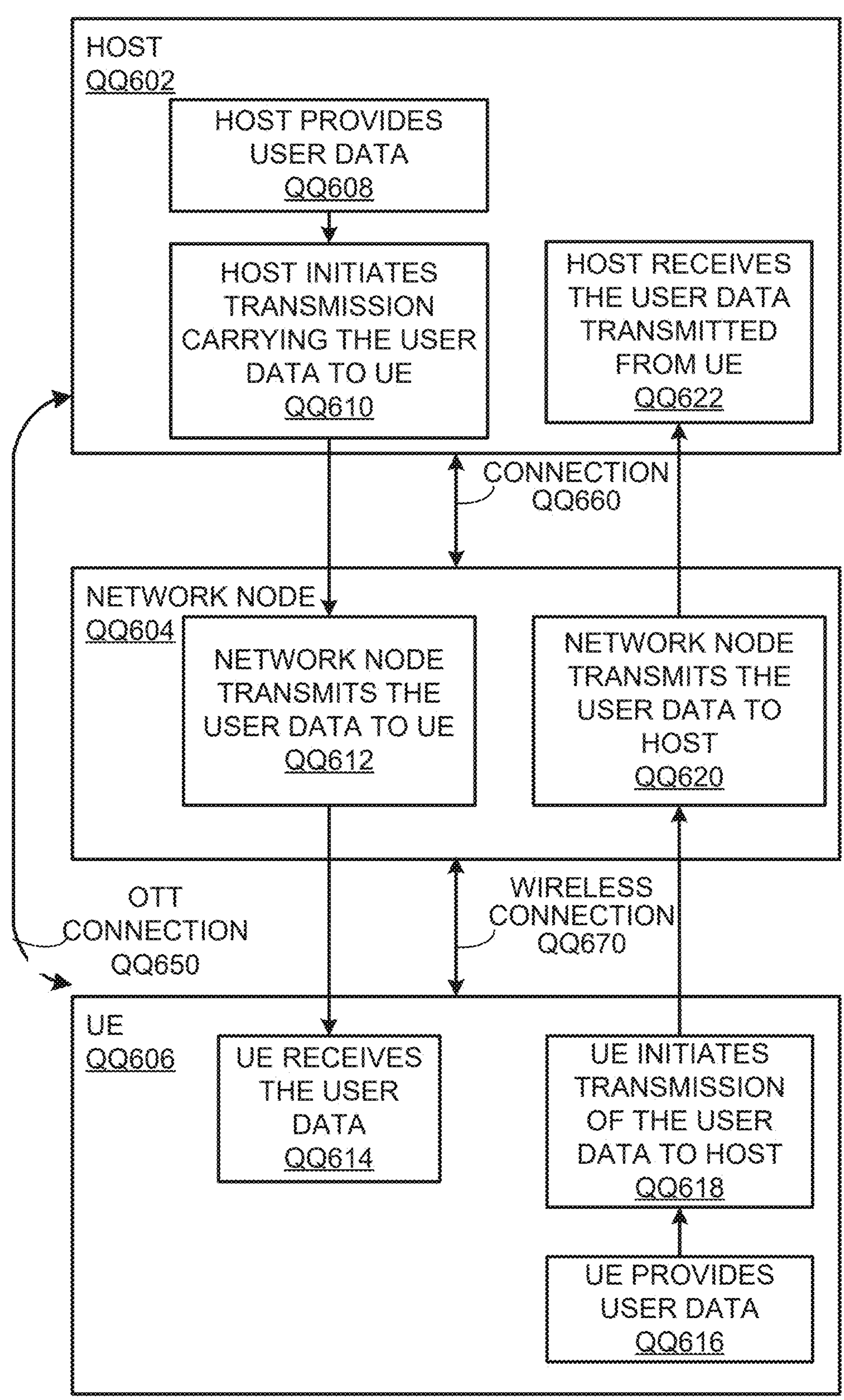
FIG. 12 shows a communication diagram of a host communicating via a network node with a user equipment over a partially wireless connection in accordance with some embodiments.

FIG. 12 shows a communication diagram of a host QQ602 communicating via a network node QQ604 with a UE QQ606 over a partially wireless connection in accordance with some embodiments. Example implementations, in accordance with various embodiments, of the UE (such as a UE QQ112*a* of FIG. 7 and/or UE QQ200 of FIG. 8), network node (such as network node QQ110*a* of FIG. 7 and/or network node QQ300 of FIG. 9), and host (such as host QQ116 of FIG. 7 and/or host QQ400 of FIG. 10) discussed in the preceding paragraphs will now be described with reference to FIG. 12.

Like host QQ400, embodiments of host QQ602 include hardware, such as a communication interface, processing circuitry, and memory. The host QQ602 also includes software, which is stored in or accessible by the host QQ602 and executable by the processing circuitry. The software includes a host application that may be operable to provide a service to a remote user, such as the UE QQ606 connecting via an over-the-top (OTT) connection QQ650 extending between the UE QQ606 and host QQ602. In providing the service to the remote user, a host application may provide user data which is transmitted using the OTT connection QQ650.

The network node QQ604 includes hardware enabling it to communicate with the host QQ602 and UE QQ606. The connection QQ660 may be direct or pass through a core network (like core network QQ106 of FIG. 7) and/or one or more other intermediate networks, such as one or more public, private, or hosted networks. For example, an intermediate network may be a backbone network or the Internet.

The UE QQ606 includes hardware and software, which is stored in or accessible by UE QQ606 and executable by the UE's processing circuitry. The software includes a client application, such as a web browser or operator-specific "app" that may be operable to provide a service to a human or non-human user via UE QQ606 with the support of the host QQ602. In the host QQ602, an executing host application may communicate with the executing client application via the OTT connection QQ650 terminating at the UE QQ606 and host QQ602. In providing the service to the user, the UE's client application may receive request data from the host's host application and provide user data in response to the request data. The OTT connection QQ650 may transfer both the request data and the user data. The UE's client application may interact with the user to generate the user data that it provides to the host application through the OTT connection QQ650.

The OTT connection QQ650 may extend via a connection QQ660 between the host QQ602 and the network node QQ604 and via a wireless connection QQ670 between the network node QQ604 and the UE QQ606 to provide the connection between the host QQ602 and the UE QQ606. The connection QQ660 and wireless connection QQ670, over which the OTT connection QQ650 may be provided, have been drawn abstractly to illustrate the communication between the host QQ602 and the UE QQ606 via the network node QQ604, without explicit reference to any intermediary devices and the precise routing of messages via these devices.

As an example of transmitting data via the OTT connection QQ650, in step QQ608, the host QQ602 provides user data, which may be performed by executing a host application. In some embodiments, the user data is associated with a particular human user interacting with the UE QQ606. In other embodiments, the user data is associated with a UE QQ606 that shares data with the host QQ602 without explicit human interaction. In step QQ610, the host QQ602 initiates a transmission carrying the user data towards the UE QQ606. The host QQ602 may initiate the transmission responsive to a request transmitted by the UE QQ606. The request may be caused by human interaction with the UE QQ606 or by operation of the client application executing on the UE QQ606. The transmission may pass via the network node QQ604, in accordance with the teachings of the embodiments described throughout this disclosure. Accordingly, in step QQ612, the network node QQ604 transmits to the UE QQ606 the user data that was carried in the transmission that the host QQ602 initiated, in accordance with the teachings of the embodiments described throughout this disclosure. In step QQ614, the UE QQ606 receives the user data carried in the transmission, which may be performed by a client application executed on the UE QQ606 associated with the host application executed by the host QQ602.

In some examples, the UE QQ606 executes a client application which provides user data to the host QQ602. The user data may be provided in reaction or response to the data received from the host QQ602. Accordingly, in step QQ616, the UE QQ606 may provide user data, which may be performed by executing the client application. In providing the user data, the client application may further consider user input received from the user via an input/output interface of the UE QQ606. Regardless of the specific manner in which the user data was provided, the UE QQ606 initiates, in step QQ618, transmission of the user data towards the host QQ602 via the network node QQ604. In step QQ620, in accordance with the teachings of the embodiments described throughout this disclosure, the network node QQ604 receives user data from the UE QQ606 and initiates transmission of the received user data towards the host QQ602. In step QQ622, the host QQ602 receives the user data carried in the transmission initiated by the UE QQ606.

One or more of the various embodiments improve the performance of OTT services provided to the UE QQ606 using the OTT connection QQ650, in which the wireless connection QQ670 forms the last segment. More precisely, the teachings of these embodiments may enable prioritization between multiple RACH procedures. In some embodiments, prioritization between multiple RACH procedures can avoid an interruption (or even causing a failure) towards the serving cell. In additional or alternative embodiments, transmissions and receptions towards the serving cell will not stay out of sync for very long. In additional or alternative embodiments, the cell prioritization can allow the UE to avoid or reduce delaying a random access procedure for, for example, the early UL sync procedure with the consequence that the network may not have enough time to calculate a TA value before an LTM cell switch procedure is triggered at the UE. In this case, since the LTM cell switch command that is sent to the UE to initiate an LTM cell switch procedure may include a TA value, if the network is not able to calculate a TA the only solution for the UE is to perform an LTM cell switch procedure which includes initiating a random access procedure.

In an example scenario, factory status information may be collected and analyzed by the host QQ602. As another example, the host QQ602 may process audio and video data which may have been retrieved from a UE for use in creating maps. As another example, the host QQ602 may collect and analyze real-time data to assist in controlling vehicle congestion (e.g., controlling traffic lights). As another example, the host QQ602 may store surveillance video uploaded by a UE. As another example, the host QQ602 may store or control access to media content such as video, audio, VR or AR which it can broadcast, multicast or unicast to UEs. As other examples, the host QQ602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection QQ650 between the host QQ602 and UE QQ606, in response to variations in the measurement results. The measurement procedure and/or the network functionality for reconfiguring the OTT connection may be implemented in software and hardware of the host QQ602 and/or UE QQ606. In some embodiments, sensors (not shown) may be deployed in or in association with other devices through which the OTT connection QQ650 passes; the sensors may participate in the measurement procedure by supplying values of the monitored quantities exemplified above, or supplying values of other physical quantities from which software may compute or estimate the monitored quantities. The reconfiguring of the OTT connection QQ650 may include message format, retransmission settings, preferred routing etc.; the reconfiguring need not directly alter the operation of the network node QQ604. Such procedures and functionalities may be known and practiced in the art. In certain embodiments, measurements may involve proprietary UE signaling that facilitates measurements of throughput, propagation times, latency and the like, by the host QQ602. The measurements may be implemented in that software causes messages to be transmitted, in particular empty or 'dummy' messages, using the OTT connection QQ650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

EMBODIMENTS

1. A method of operating a communication device (QQ200), the method comprising:
   determining (610) that a first trigger to initiate a first random access, RA, procedure has been met;
   subsequent to determining that the first trigger has been met and prior to completing the first RA procedure, determining (620) that a second trigger to initiate a second RA procedure has been met;
   responsive to determining that the second trigger has been met, determining (630) which of the first RA procedure and the second RA procedure to prioritize; and
   responsive to determining which of the first RA procedure and the second RA procedure to prioritize, prioritizing (640) the first RA procedure or the second RA procedure.
2. The method of Embodiment 1, wherein determining that the second trigger has been met comprises determining that the second trigger has been met prior to a RA preamble being transmitted by the communication device as part of the first RA procedure,
   wherein proceeding with the first RA procedure or the second RA procedure comprises transmitting a RA preamble as part of the first RA procedure or the second RA procedure.
3. The method of any of Embodiments 1-2, wherein the first RA procedure comprises a RA procedure with a serving cell, and
   wherein the second RA procedure comprises a RA procedure with a lower-layer triggered mobility, LTM, candidate cell.
4. The method of any of Embodiments 1-2, wherein the first RA procedure comprises a RA procedure with a lower-layer triggered mobility, LTM, candidate cell, and
   wherein the second RA procedure comprises a RA procedure with a serving cell.
5. The method of any of Embodiments 1-2, wherein the first RA procedure comprises a RA procedure with a first lower-layer triggered mobility, LTM, candidate cell, and
   wherein the second RA procedure comprises a RA procedure with a second LTM candidate cell.
6. The method of any of Embodiments 1-5, wherein determining which of the first RA procedure and the second RA procedure to prioritize comprises determining which of the first RA procedure and the second RA procedure to prioritize based on configuration information.
7. The method of Embodiment 6, wherein the configuration information includes one or more prioritization rules, the prioritization rules including at least one of:
   prioritize the RA procedure associated with a serving cell;
   prioritize the RA procedure that is triggered due to a failure event;
   prioritize the RA procedure that is triggered due to an early UL sync procedure;
   prioritize the RA procedure based on an order for which the indication to initiate the RA procedures is received;
   prioritize the RA procedure based on L1 measurements;
   prioritize the RA procedure based on L3 measurements;
   prioritize the RA procedure based on a strongest cell out of "N" cells, according to a measurement quantity;
   prioritize the RA procedure associated with a cell based on when the communication last performed a random access procedure with the cell;
   prioritize the RA procedure for which the communication device has initiated a random access procedure and is about to perform a random access preamble retransmission;
   prioritize the RA procedure for which it performs a first random access preamble transmission;
   prioritize the RA procedure for which the random access would be transmitted with highest power;
   prioritize the RA procedure for which the random access would be transmitted with lowest power;
   prioritize the RA procedure based on link budget;
   prioritize the RA procedure based on feature prioritization for the random access;
   prioritize the RA procedure for which the random access is a 2-step random access;
   prioritize the RA procedure for which the random access is a 4-step random access;
   prioritize the RA procedure for which the random access is a contention-free random access;
   prioritize the RA procedure for which the random access is a contention-based random access;
   prioritize the RA procedure based on random access resource selection;
   prioritize the RA procedure for which beam failure recovery timer is running or not running;
   prioritize the RA procedure based on random selection;

prioritize the RA procedure based on round-robin selection;

prioritize the RA procedure based on access barring or access control;

prioritize the RA procedure associated with a LTM candidate cell in detriment of a RA to a serving cell when the UE has received the trigger for RACH transmission to the LTM candidate cell in response to a PDCCH order received in response to a lower layer measurement; and prioritize performing RA to a first LTM candidate cell in detriment of performing RA to a second LTM candidate cell when RA to the first LTM candidate cell is triggered for an LTM cell switch compared to the triggering of RA to the second LTM candidate cell being for other events.

8. The method of any of Embodiments 1-7, wherein determining which of the first RA procedure and the second RA procedure to prioritize comprises determining which of the first RA procedure and the second RA procedure to prioritize based on a type of cell associated with the first RA procedure and a type of cell associated with the second RA procedure.

9. The method of any of Embodiments 1-8, wherein determining which of the first RA procedure and the second RA procedure to prioritize comprises determining to prioritize the first RA procedure, wherein prioritizing the first RA procedure or the second RA procedure comprises at least one of the following:

performing the first RA procedure before performing the second RA procedure;

initiating the first RA procedure before initiating the second RA procedure;

suspending the second RA procedure until completion of the first RA procedure; and aborting the second RA procedure.

10. The method of any of Embodiments 1-9, wherein determining which of the first RA procedure and the second RA procedure to prioritize comprises determining to prioritize the second RA procedure, wherein prioritizing the first RA procedure or the second RA procedure comprises at least one of the following:

performing the second RA procedure before performing the first RA procedure;

initiating the second RA procedure before initiating the first RA procedure;

suspending the first RA procedure until completion of the second RA procedure; and aborting the first RA procedure.

11. A communication device (QQ200), the communication device comprising:

processing circuitry (QQ202); and memory (QQ210) coupled to the processing circuitry and having instructions stored therein that are executable by the processing circuitry to cause the communication device to perform operations comprising any of the operations of Embodiments 1-10.

12 A computer program comprising program code to be executed by processing circuitry (QQ202) of a communication device (QQ200), whereby execution of the program code causes the communication device to perform operations comprising any operations of Embodiments 1-10.

13. A computer program product comprising a non-transitory storage medium (QQ210) including program code to be executed by processing circuitry (QQ202) of a communication device (QQ200), whereby execution of the program code causes the communication device to perform operations comprising any operations of Embodiments 1-10.

14. A non-transitory computer-readable medium having instructions stored therein that are executable by processing circuitry (QQ202) of a communication device (QQ200) to cause the communication device to perform operations comprising any of the operations of Embodiments 1-10.

15. A user equipment for prioritizing between multiple random access channel, RACH, procedures, comprising:

processing circuitry configured to perform any of the steps of any of the Group A embodiments; and power supply circuitry configured to supply power to the processing circuitry.

16. A user equipment (UE) for prioritizing between multiple random access channel, RACH, procedures, the UE comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the operations of Embodiments 1-10;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

17. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the operations of Embodiments 1-10 to receive the user data from the host.

18. The host of the previous embodiment, wherein the cellular network further includes a network node configured to communicate with the UE to transmit the user data to the UE from the host.

19. The host of the previous 2 embodiments, wherein:

the processing circuitry of the host is configured to execute a host application, thereby providing the user data; and the host application is configured to interact with a client application executing on the UE, the client application being associated with the host application.

20. A method implemented by a host operating in a communication system that further includes a network node and a user equipment (UE), the method comprising:

providing user data for the UE; and initiating a transmission carrying the user data to the UE via a cellular network comprising the network node, wherein the UE performs any of the operations of Embodiments 1-10 to receive the user data from the host.

21. The method of the previous embodiment, further comprising:

at the host, executing a host application associated with a client application executing on the UE to receive the user data from the host application.

22. The method of the previous embodiment, further comprising:

at the host, transmitting input data to the client application executing on the UE, the input data being provided by executing the host application, wherein the user data is provided by the client application in response to the input data from the host application.

23. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the operations of Embodiments 1-10 to transmit the user data to the host.

24. The host of the previous embodiment, wherein the cellular network further includes a network node configured to communicate with the UE to transmit the user data from the UE to the host.

25. The host of the previous 2 embodiments, wherein:

the processing circuitry of the host is configured to execute a host application, thereby providing the user data; and the host application is configured to interact with a client application executing on the UE, the client application being associated with the host application.

26. A method implemented by a host configured to operate in a communication system that further includes a network node and a user equipment (UE), the method comprising: at the host, receiving user data transmitted to the host via the network node by the UE, wherein the UE performs any of the operations of Embodiments 1-10 to transmit the user data to the host.

27. The method of the previous embodiment, further comprising:

at the host, executing a host application associated with a client application executing on the UE to receive the user data from the UE.

28. The method of the previous 2 embodiments, further comprising:

at the host, transmitting input data to the client application executing on the UE, the input data being provided by executing the host application, wherein the user data is provided by the client application in response to the input data from the host application.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
BSR Buffer Status Report
BWP Bandwidth Part
CBRA Contention Based Random Access
CCCH Common Control Channel
C-RNTI Cell RNTI
CG Configured Grant
CORESET Control Resource Set
CRC Cyclic Redundancy Check
CSI Channel State Information
CSS Common Search Space
DCI Downlink Control Information
DG Dynamic Grant
DL Downlink
DL-SCH Downlink Shared channel
DMRS Demodulated Reference Signal
eMBB enhanced Mobile Broadband
eRedCap Enhanced Reduced Capability NR Devices
IE Information Element
I-RNTI Inactive RNTI
LCH Logical Channel
LCID Logical Channel ID
LPWA Low power wide area
LTE Long-Term Evolution
MAC Medium Access Control
MAC CE Medium Access Control-Control Element
MICO Mobile Originated Communication Only
MIMO Multiple-Input and Multiple-Output
mMTC massive Machine-Type Communication
Msg1/2/3/4/5 Message 1/2/3/4/5 of 4-step random access procedure
MsgA/B Message A/B of 2-step random access procedure
MTC Machine-Type Communications
MT-SDT Mobile Terminated Small Data Transmission
NB-IoT Narrowband Internet of Things
NR New Radio
NUL Normal Uplink
NW Network
OFDM Orthogonal Frequency-Division Multiplexing
PC Power Control
PDCCH Physical Downlink Control Channel
PDSCH Physical Downlink Shared Channel
PDU Protocol Data Unit
PRACH Physical Random Access Channel
PRB Physical Resource Block
PSM Power Saving Mode
PUCCH Physical Uplink Control Channel
PUSCH Physical Uplink Shared Channel
RA Random Access
RACH Random Access Channel
RAI Release Assistance Information
RAPID Random Access Preamble Identifier
RAR Random Access Response
RA-RNTI Random Access RNTI
RedCap Reduced Capability NR Devices
RNTI Radio Network Temporary Identifier
RRC Radio Resource Control
RSRP Received Signal Reference Power
SDT Small Data Transmission
SCS Subcarrier Spacing
SI System information
SIB System information block
SRI SRS Resource Indicator
SRS Sounding Reference Signal SSB Synchronization Signal Block
SUL Supplementary Uplink
TC-RNTI Temporary Cell RNTI
UAI UE Assistance Information
UCI Uplink Control information
UE User equipment
UL Uplink
UL-SCH Uplink Shared channel
5GC or 5GCN 5G Core Network
ACK Acknowledgement
AGC Automatic Gain Control
AMF Access and Mobility management Function
AP Application Protocol
ARQ Automatic Repeat Request
BFD Beam Failure Monitoring
BFR Beam Failure Recovery
BSR Buffer Status Report
BWP Bandwidth Part
C-RNTI Cell Radio Network Temporary Identifier
CA Carrier Aggregation
CE Control Element
CGI Cell Global Identity
CHO Conditional Handover
CN Core Network
CPA Conditional PSCell Addition
CPC Conditional PSCell Change
CP Control Plane
CQI Channel Quality Indicator
C-RNTI Cell Radio Network Temporary Identifier
CSI Channel State Information
CU Central Unit
DC Dual Connectivity
DCI Downlink Control Information
DL Downlink
DRB Data Radio Bearer
DU Distributed Unit
eNB (EUTRAN) base station
E-RAB EUTRAN Radio Access Bearer
E-UTRAN E-UTRA Evolved Universal Terrestrial Radio Access
Evolved Universal Terrestrial Radio Access Network
F1 Interface between Central Unit and Distributed Unit
FDD Frequency Division Duplex
gNB NR base station
GTP-U GPRS Tunneling Protocol-User Plane
HARQ Hybrid ARQ
IE Information Element
IP Internet Protocol
LTE Long Term Evolution
LTM L1/L2-Triggered Mobility
MCG Master Cell Group
MAC Medium Access Control
MAC CE MAC Control Element
MN Master Node
MR-DC Multi-Radio Dual Connectivity
NACK Negative Acknowledgement
NAS Non Access Stratum
NG-RAN Next Generation Radio Access Network
Ng-eNB Next Generation Evolved Node B
NR New Radio
PDCP Packet Data Convergence Protocol
PCell Primary Cell
PCI Physical Cell Identity
PDCCH Physical Downlink Control Channel
PHR Power headroom report
PSCell Primary Secondary Cell (in LTE) or Primary SCG Cell (in NR)
PUCCH Physical Uplink Control Channel
PUSCH Physical Uplink Shared Channel
RACH Random Access Channel
RAT Radio Access Technology
RB Radio Bearer
RLC Radio Link Control
RLF Radio Link Failure
RRC Radio Resource Control
RSRP Reference Signal Received Power
RSRQ Reference Signal Received Quality
SCell Secondary Cell
SCG Secondary Cell Group
SCTP Stream Control Transmission Protocol
SeNB Secondary eNB
SgNB Secondary gNB
SINR Signal to Interference plus Noise Ratio
SN Secondary Node
SR Scheduling Request
SRB Signaling Radio Bearer
SSB Synchronization Signal Block
SUL Supplementary uplink
SpCell Special Cell, the primary cell of a master or secondary cell group
TAT Time Alignment Timer
TA Time Alignment
TCI Transmission Configuration Indication
TDD Time Division Duplex
TEID Tunnel Endpoint IDentifier
TNL Transport Network Layer
T-SN Target Secondary Node
UCI Uplink Control Information
UDP User Datagram Protocol
UPF User Plane Function
UE User Equipment
UL Uplink
UL-SCH Uplink Shared Channel
UP User Plane
URLLC Ultra Reliable Low Latency Communication
X2 Interface between base stations
Xn Interface between base stations

What is claimed is:

1. A method of operating a user equipment, UE, the method comprising:

receiving a PDCCH order that triggers the UE to initiate a first random access, RA, procedure with a L1/L2-Triggered Mobility, LTM, candidate cell;

subsequent to receiving the PDCCH order and prior to the first RA occasion, receiving a Beam Failure Detection, BFD, that triggers the UE to initiate a second random access, RA, procedure with a serving cell prior to the first RA occasion;

responsive to receiving the BFD, prioritizing one of the first RA procedure or the second RA procedure, wherein prioritizing the first RA procedure or the second RA procedure is based on one or more prioritization rules, the prioritization rules including at least one of:

prioritize the RA procedure based on L1 measurements; or, prioritize the RA procedure based on L3 measurements.

2. The method of claim 1, wherein determining that the second trigger has been met comprises determining that the second trigger has been met prior to the first RA occasion.

3. The method of claim 1, wherein the first RA occasion is the first RA occasion available during which the first RA preamble could be scheduled to be transmitted as part of the first RA procedure.

4. The method of claim 1, wherein the first RA procedure comprises transmitting the first RA preamble as part of the first RA procedure and wherein the second RA procedure comprises transmitting a second RA preamble as part of the second RA procedure.

5. The method of claim 1, wherein determining which of the first RA procedure and the second RA procedure to prioritize is based on configuration information.

6. The method of claim 1, wherein determining which of the first RA procedure and the second RA procedure to prioritize comprises is based on a type of cell associated with the first RA procedure and a type of cell associated with the second RA procedure.

7. The method of claim 1, wherein prioritizing the first RA procedure over the second RA procedure comprises at least one of the following:

performing the first RA procedure before performing the second RA procedure;

initiating the first RA procedure before initiating the second RA procedure;

suspending the second RA procedure until completion of the first RA procedure; or aborting the second RA procedure.

8. The method of claim 7, wherein performing the first RA procedure before performing the second RA procedure comprises transmitting the first RA preamble during the first RA occasion.

9. The method of claim 1, wherein prioritizing the second RA procedure over the first RA procedure comprises at least one of the following:

performing the second RA procedure before performing the first RA procedure;

initiating the second RA procedure before initiating the first RA procedure;

suspending the first RA procedure until completion of the second RA procedure; and aborting the first RA procedure.

10. The method of claim 9, wherein performing the second RA procedure before performing the first RA procedure comprises transmitting the second RA preamble during the first RA occasion.

11. A user equipment, UE, the UE comprising:

processing circuitry; and memory coupled to the processing circuitry and having instructions stored therein that are executable by the processing circuitry to cause the UE to perform operations comprising:

receiving a PDCCH order that triggers the UE to initiate a first random access, RA, procedure with a L1/L2-Triggered Mobility, LTM, candidate cell;

subsequent to receiving the PDCCH order and prior to the first RA occasion, receiving a Beam Failure Detection, BFD, that triggers the UE to initiate a second random access, RA, procedure with a serving cell prior to the first RA occasion;

responsive to receiving the BFD, prioritizing one of the first RA procedure or the second RA procedure, wherein prioritizing the first RA procedure or the second RA procedure is based on one or more prioritization rules, the prioritization rules including at least one of:

prioritize the RA procedure based on L1 measurements; or, prioritize the RA procedure based on L3 measurements.

12. A non-transitory computer-readable medium having instructions stored therein that, when executed by processing circuitry of a user equipment (UE), cause the UE to perform operations comprising:

receiving a PDCCH order that triggers the UE to initiate a first random access, RA, procedure with a L1/L2-Triggered Mobility, LTM, candidate cell;

subsequent to receiving the PDCCH order and prior to the first RA occasion, receiving a Beam Failure Detection, BFD, that triggers the UE to initiate a second random access, RA, procedure with a serving cell prior to the first RA occasion;

responsive to receiving the BFD, prioritizing one of the first RA procedure or the second RA procedure, wherein prioritizing the first RA procedure or the second RA procedure is based on one or more prioritization rules, the prioritization rules including at least one of:

prioritize the RA procedure based on L1 measurements; or, prioritize the RA procedure based on L3 measurements.

* * * * *